(12) United States Patent
Takashima et al.

(10) Patent No.: US 8,929,540 B2
(45) Date of Patent: Jan. 6, 2015

(54) INFORMATION PROCESSING APPARATUS, INFORMATION RECORDING MEDIUM MANUFACTURING APPARATUS, INFORMATION RECORDING MEDIUM, METHOD, AND COMPUTER PROGRAM

(75) Inventors: Yoshikazu Takashima, Tokyo (JP); Tateo Oishi, Saitama (JP); Katsumi Muramatsu, Tokyo (JP); Kenjiro Ueda, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1746 days.

(21) Appl. No.: 11/814,896

(22) PCT Filed: Feb. 16, 2006

(86) PCT No.: PCT/JP2006/302700
§ 371 (c)(1),
(2), (4) Date: Sep. 30, 2008

(87) PCT Pub. No.: WO2006/090627
PCT Pub. Date: Aug. 31, 2006

(65) Prior Publication Data
US 2009/0041237 A1    Feb. 12, 2009

(30) Foreign Application Priority Data

Feb. 25, 2005   (JP) .............................. P2005-051630

(51) Int. Cl.
*H04L 9/00*       (2006.01)
*G11B 20/00*      (2006.01)
(Continued)

(52) U.S. Cl.
CPC ...... *G11B 20/00086* (2013.01); *G11B 20/0021* (2013.01); *G11B 20/00246* (2013.01); *G11B 20/00362* (2013.01); *G11B 20/00507* (2013.01); *G11B 20/00768* (2013.01); *G11B 20/10* (2013.01); *G11B 27/105* (2013.01);
(Continued)

(58) Field of Classification Search
USPC .............................. 380/44, 200, 277; 713/193
See application file for complete search history.

(56) References Cited

U.S. PATENT DOCUMENTS 5,754,649 A * 5/1998 Ryan et al. ..................... 380/203
6,529,949 B1 * 3/2003 Getsin et al. ................... 709/217
(Continued)

FOREIGN PATENT DOCUMENTS

JP          9-97216       4/1997
JP     HEI 09-097216      4/1997
(Continued)

OTHER PUBLICATIONS

Taylor et al, ORBit: An Adaptive Data Shaping Technique for Robust Wireless Video Clip Communication, 2003, IEEE, pp. 1567-1571.*

(Continued)

*Primary Examiner* — Luu Pham
*Assistant Examiner* — Jenise Jackson
(74) *Attorney, Agent, or Firm* — K&L Gates LLP

(57) ABSTRACT

To provide a configuration in which a unit classification number corresponding to a content playback path is set based on various units. A unit classification number defining a playback path of content including encrypted data having different variations generated by encrypting a segment portion which forms the content by using a plurality of segment keys and encrypted content generated by encrypting a non-segment portion by a unit key is set based on various units, such as a content management unit and an index. In a CPS unit key file storing key generating information concerning CPS units as content management units, settings of unit classification numbers are indicated. Based on the CPS unit key file, a unit classification number to which content to be played back belongs can be obtained.

16 Claims, 27 Drawing Sheets

(51) Int. Cl.
*G11B 20/10* (2006.01)
*G11B 27/10* (2006.01)
*H04N 5/913* (2006.01)
*H04N 21/433* (2011.01)
*H04N 21/4408* (2011.01)
*H04N 21/4623* (2011.01)
*H04N 21/4627* (2011.01)
*H04N 21/8358* (2011.01)
*H04N 21/845* (2011.01)
*H04L 9/08* (2006.01)
*H04N 5/765* (2006.01)
*H04N 5/775* (2006.01)
*H04N 5/85* (2006.01)
*H04N 9/79* (2006.01)
*H04N 9/804* (2006.01)
*H04N 9/806* (2006.01)
*H04N 9/82* (2006.01)

(52) U.S. Cl.
CPC ........... *H04N 5/913* (2013.01); *H04N 21/4334* (2013.01); *H04N 21/4408* (2013.01); *H04N 21/4623* (2013.01); *H04N 21/4627* (2013.01); *H04N 21/8358* (2013.01); *H04N 21/8456* (2013.01); *H04L 9/0872* (2013.01); *G11B 2020/10537* (2013.01); *G11B 2220/213* (2013.01); *G11B 2220/2541* (2013.01); *H04N 5/765* (2013.01); *H04N 5/775* (2013.01); *H04N 5/85* (2013.01); *H04N 9/7921* (2013.01); *H04N 9/8042* (2013.01); *H04N 9/8063* (2013.01); *H04N 9/8205* (2013.01); *H04N 9/8211* (2013.01); *H04N 9/8227* (2013.01); *H04N 9/8233* (2013.01); *H04N 2005/91364* (2013.01); *H04L 2209/605* (2013.01)
USPC ............ 380/44; 380/200; 380/201; 380/277; 380/278; 713/165; 713/171; 713/193; 726/26; 726/30; 726/31; 726/32

(56) References Cited

U.S. PATENT DOCUMENTS

| 6,714,650 | B1* | 3/2004 | Maillard et al. | 380/231 |
| 7,555,779 | B2* | 6/2009 | Nakano et al. | 726/26 |
| 7,596,698 | B2* | 9/2009 | Hirota et al. | 713/172 |
| 2004/0133794 | A1* | 7/2004 | Kocher et al. | 713/193 |
| 2005/0065890 | A1* | 3/2005 | Benaloh | 705/51 |
| 2005/0097062 | A1* | 5/2005 | Benaloh | 705/71 |
| 2005/0193210 | A1* | 9/2005 | Benaloh | 713/182 |
| 2006/0212400 | A1* | 9/2006 | Kamperman et al. | 705/51 |
| 2007/0174334 | A1* | 7/2007 | Inoue et al. | 707/104.1 |
| 2008/0022131 | A1* | 1/2008 | Ueda et al. | 713/193 |
| 2008/0228300 | A1* | 9/2008 | Tagawa et al. | 700/94 |
| 2008/0253734 | A1* | 10/2008 | Kang et al. | 386/46 |
| 2008/0282083 | A1* | 11/2008 | Risan et al. | 713/153 |
| 2009/0010437 | A1* | 1/2009 | Takashima et al. | 380/277 |
| 2010/0034388 | A1* | 2/2010 | Nakano et al. | 380/277 |
| 2010/0077022 | A1* | 3/2010 | Mikkelsen et al. | 709/203 |

FOREIGN PATENT DOCUMENTS

| JP | 2001-209312 | 8/2001 |
| JP | 2002-165191 | 6/2002 |
| JP | 2003-78517 | 3/2003 |
| JP | 2003-078517 | 3/2003 |

OTHER PUBLICATIONS

Wu et al, Flexible Access to Video Streaming, 2004, IEEE, pp. 2568-2571.*

International Preliminary Report on Patentability for International Application No. PCT/JP2006/302700.

Japanese Office Action issued on Nov. 24, 2010, for corresponding Japanese Appl. No. 2005-051630.

* cited by examiner

FIG. 5

| INDEX INDEXES, FOR EXAMPLE, TITLES, THAT CAN BE DISTINGUISHED IN APPLICATION LAYER | CONTENT MANAGEMENT UNIT NUMBER (CPS UNIT NUMBER) | UNIT CLASSIFICATION NUMBER (Movie Sequence Number) | ENCRYPTED CPS UNIT KEY |
|---|---|---|---|
| TITLE 1 | CPS1 | 14 | [Ku1] |
| TITLE 2 | CPS1 | 14 | [Ku1] |
| APPLICATION 1 | CPS2 | 35 | [Ku2] |
| APPLICATION 2 | CPS3 | 22 | [Ku3] |
| .. | .. | .. | .. |
| DATA GROUP 1 | CPS4 | 138 | [Ku4] |
| DATA GROUP 2 | CPS5 | 3 | [Ku5] |
| .. | | | .. |

FIG. 7

| UNIT VERSION (UNIT CLASSIFICATION NUMBER: i) | SEGMENT 0 | SEGMENT 1 | SEGMENT 2 | ... | SEGMENT 14 |
|---|---|---|---|---|---|
| V(0,i) | Enc(Ke'(0,i),Ks'(0,3)) | Enc(Ke'(0,i),Ks'(1,2)) | Enc(Ke'(0,i),Ks'(2,4)) | ... | Enc(Ke'(0,i),Ks'(14,14)) |
| V(1,i) | Enc(Ke'(1,i),Ks'(0,7)) | Enc(Ke'(1,i),Ks'(1,7)) | Enc(Ke'(1,i),Ks'(2,1)) | ... | Enc(Ke'(1,i),Ks'(14,1)) |
| V(2,i) | Enc(Ke'(2,i),Ks'(0,6)) | Enc(Ke'(2,i),Ks'(1,3)) | Enc(Ke'(2,i),Ks'(2,12)) | ... | Enc(Ke'(2,i),Ks'(14,6)) |
| V(3,i) | Enc(Ke'(3,i),Ks'(0,3)) | Enc(Ke'(3,i),Ks'(1,8)) | Enc(Ke'(3,i),Ks'(2,0)) | ... | Enc(Ke'(3,i),Ks'(14,12)) |
| .. | .. | .. | .. | .. | .. |
| V(j,i) | Enc(Ke'(j,i),Ks'(0,0)) | Enc(Ke'(j,i),Ks'(1,9)) | Enc(Ke'(j,i),Ks'(2,13)) | ... | Enc(Ke'(j,i),Ks'(14,11)) |
| .. | .. | .. | .. | .. | .. |
| V(255,i) | Enc(Ke'(255,i),Ks'(0,15)) | Enc(Ke'(255,i),Ks'(1,3)) | Enc(Ke'(255,i),Ks'(2,7)) | ... | Enc(Ke'(255,i),Ks'(14,8)) |

V (PATH NUMBER, UNIT CLASSIFICATION NUMBER)

Ke'(PATH NUMBER, UNIT CLASSIFICATION NUMBER) Ks'(SEGMENT NUMBER, VARIATION NUMBER)

FIG. 8

```
Segment Key File{
  for (i = 0; i < n_cu; i++){
    CPS Unit Number Using Sequence Key
    for (j = 0; j < 256; j++){
      for (k = 0; k < 15; k++){
        PlayList id(j, k);
        PlayItem id(j, k);
        Enc (Ke', Segment Key(j, k));
      }
    }
  }
}
```

Number of Bytes

2 ~331

2
2     } 332
16

* $n_{cu}$: NUMBER OF CPS UNITS USING SEQUENCE KEY (SEGMENT KEY STRING)
* PlayList id: ID FOR UNIQUELY IDENTIFYING PLAYLIST ON THE SAME DISC
* PlayItem id: ID FOR UNIQUELY IDENTIFYING PLAY ITEM IN THE SAME PLAYLIST

FIG. 9

| UNIT VERSION (UNIT CLASSIFICATION NUMBER: i) | SEGMENT 0 | SEGMENT 1 | .. |
|---|---|---|---|
| V(0,1) | PLAYLIST ID (0, 3) PLAY ITEM ID (0, 3) Enc(Ke' (0,i),Ks'(0,3)) | PLAYLIST ID (1, 2) PLAY ITEM ID (1, 2) Enc(Ke' (0,i),Ks'(1,2)) | .. |
| .. | .. | .. | .. |

FIG. 10

| UNIT CLASSIFICATION NUMBER | UNIT VERSION | UNIT CLASSIFICATION KEY |
|---|---|---|
| 0 | V(35,0) | Kc(35,0) |
| 1 | V(241,1) | Kc(241,1) |
| 2 | V(74,2) | Kc(74,2) |
| 3 | V(35,3) | Kc(35,3) |
| .. | .. | .. |
| i | V(1,i) | Kc(1,i) |
| .. | .. | .. |
| 254 | V(95,254) | Kc(95,254) |

Kc (PATH NUMBER, UNIT CLASSIFICATION NUMBER)

V (PATH NUMBER, UNIT CLASSIFICATION NUMBER)

FIG. 14

| INDEX INDEXES, FOR EXAMPLE, TITLES, THAT CAN BE DISTINGUISHED IN APPLICATION LAYER | CONTENT MANAGEMENT UNIT NUMBER (CPS UNIT NUMBER) | UNIT CLASSIFICATION NUMBER (Movie Sequence Number) | ENCRYPTED CPS UNIT KEY |
|---|---|---|---|
| First Playback | CPS1 | 1 | [Ku1] |
| Top Menu | CPS1 | 1 | [Ku1] |
| TITLE 1 | CPS2 | 5 | [Ku2] |
| TITLE 2 | CPS2 | 5 | [Ku2] |
| .. | .. | .. | .. |
| APPLICATION 1 | CPS3 | 10 | [Ku3] |
| .. | .. | .. | .. |
| DATA GROUP 1 | CPS4 | 120 | [Ku4] |
| DATA GROUP 2 | CPS5 | 250 | [Ku5] |
| .. | .. | .. | .. |

FIG. 15

```
Unit_Key.inf {                                              #bytes
    CPS_Unit_number_for_FirstPlayback                         2
    CPS_Unit_number_for_TopMenu                               2
    Num_of_Title (n_t);                                       2
    for (i = 0; i < n_t; i++) {
        CPS_Unit_number for Title#i;                          2
    }                                              ⎫ 341
    Num_of_CPS_Unit (n_cu);                                   2
    for (i = 0; i < n_cu; i++) {                   ⎫ 342
        Movie_Sequence_Number for CPS Unit#i;                 1
        reserved                                              15  ⎫ 343
        Encrypted Unit Key for CPS Unit#i;                    16
    }
}
```

* Movie_Sequence_Number for CPS Unit#i: 0 to 254 ARE USED
* 255 INDICATES THAT SEQUENCE KEY IS NOT USED
* ONE SEQUENCE NUMBER IS ASSIGNED TO EACH CPS UNIT WHEN CREATING CONTENT
* IF TWO OR MORE CONTENT ITEMS ARE RECORDED IN ONE DISC AND DIFFERENT Movie_Sequence_Numbers ARE ASSIGNED TO CONTENT ITEMS, CONTENT IS DIVIDED INTO CPS UNITS

FIG. 16

| INDEX INDEXES, FOR EXAMPLE, TITLES, THAT CAN BE DISTINGUISHED IN APPLICATION LAYER | CONTENT MANAGEMENT UNIT NUMBER (CPS UNIT NUMBER) | UNIT CLASSIFICATION NUMBER (Movie Sequence Number) | ENCRYPTED CPS UNIT KEY |
|---|---|---|---|
| First Playback | CPS1 | 1 | [Ku1] |
| Top Menu | CPS1 | 1 | [Ku1] |
| TITLE 1 | CPS2 | 5 | [Ku2] |
| TITLE 2 | CPS2 | 6 | [Ku2] |
| . . | . . | . . | . . |
| APPLICATION 1 | CPS3 | 10 | [Ku3] |
| . . | . . | . . | . . |
| DATA GROUP 1 | CPS4 | 120 | [Ku4] |
| DATA GROUP 2 | CPS5 | 250 | [Ku5] |
| . . | . . | . . | . . |

FIG. 17

```
Unit_Key.inf {                                              #bytes
      CPS_Unit_number_for_FirstPlayback                       2
351 { Movie_Sequence_Number for FirstPlayback;                1
      CPS_Unit_number_for_TopMenu                             2
      Movie_Sequence_Number for TopMenu;                      1
      Num_of_Title (n_t);                                     2
352 { for (i = 0; i < n_t; i++) {
              Movie_Sequence_Number for Title#i;              1
              reserved                                        1
              CPS_Unit_number for Title#i;                    2
      }
      Num_of_CPS_Unit (n_cu);                                 2
      for (i = 0; i < n_cu; i++) {                      } 353
              Encrypted Unit Key for CPS Unit#i;             16
      }
}
```

* Movie_Sequence_Number for CPS Unit#i: 0 to 254 ARE USED
* 255 INDICATES THAT SEQUENCE KEY IS NOT USED
* ONE SEQUENCE NUMBER IS ASSIGNED TO EACH TITLE WHEN CREATING CONTENT
* IF TWO OR MORE CONTENT ITEMS ARE RECORDED IN ONE DISC AND DIFFERENT Movie_Sequence_Numbers ARE ASSIGNED TO CONTENT ITEMS, THEY CAN BE ASSIGNED TO CORRESPONDING TITLES REGARDLESS OF FRAMEWORK OF CPS UNITS

FIG. 18

| INDEX INDEXES, FOR EXAMPLE, TITLES, THAT CAN BE DISTINGUISHED IN APPLICATION LAYER | CONTENT MANAGEMENT UNIT NUMBER (CPS UNIT NUMBER) | UNIT CLASSIFICATION NUMBER (Movie Sequence Number) | ENCRYPTED CPS UNIT KEY |
|---|---|---|---|
| First Playback | CPS1 | 1 = X(1,1) | [Ku1] |
| Top Menu | CPS1 | 2 = X(1,2) | [Ku1] |
| TITLE 1 | CPS2 | 5 = X(2,1) | [Ku2] |
| TITLE 2 | CPS2 | 6 = X(2,2) | [Ku2] |
| .. | .. | .. | .. |
| APPLICATION 1 | CPS3 | 10 = X(3,1) | [Ku3] |
| .. | .. | .. | .. |
| DATA GROUP 1 | CPS4 | 120 = X(4,1) | [Ku4] |
| DATA GROUP 2 | CPS5 | 250 = X(5,1) | [Ku5] |
| .. | .. | .. | .. |

FIG. 19

```
Unit_Key.inf {                                                      #bytes
    CPS_Unit_number_for_FirstPlayback                                  2
    CPS_Unit_number_for_TopMenu                                        2
    Num_of_Title (n_t);                                                2
    for (i = 0; i < n_t; i++) {
        CPS_Unit_number for Title#i;                                   2
    }
361
    Num_of_CPS_Unit (n_cu);                                            2
    for (i = 0; i < n_cu; i++) {
        Num_of_Movie_Sequence (n_ms);                                  2   ⎫
        for (j = 0; j < n_ms; j++) {                                       ⎬ 362
            Movie_Sequence_Number for MovieSequence(i,j);              1   ⎭
            reserved                                                   1
        }
        Encrypted Unit Key for CPS Unit#i;                            16   } 363
    }
}
```

* Movie_Sequence_Number for CPS Unit#i: 0 to 254 ARE USED
* IF SEQUENCE KEY IS NOT USED, Num_of_Movie_Sequence=0 or Movie_Sequence_Number for MovieSequence(i,j)=255
* SINCE A PLURALITY OF Movie_Sequence_Numbers CAN BE ASSIGNED TO CPS UNIT WHILE MAINTAINING FRAMEWORK OF CPS UNITS, UNIQUE Movie_Sequence_Numbers CAN BE ASSIGNED TO A PLURALITY OF TITLES IN CPS UNIT

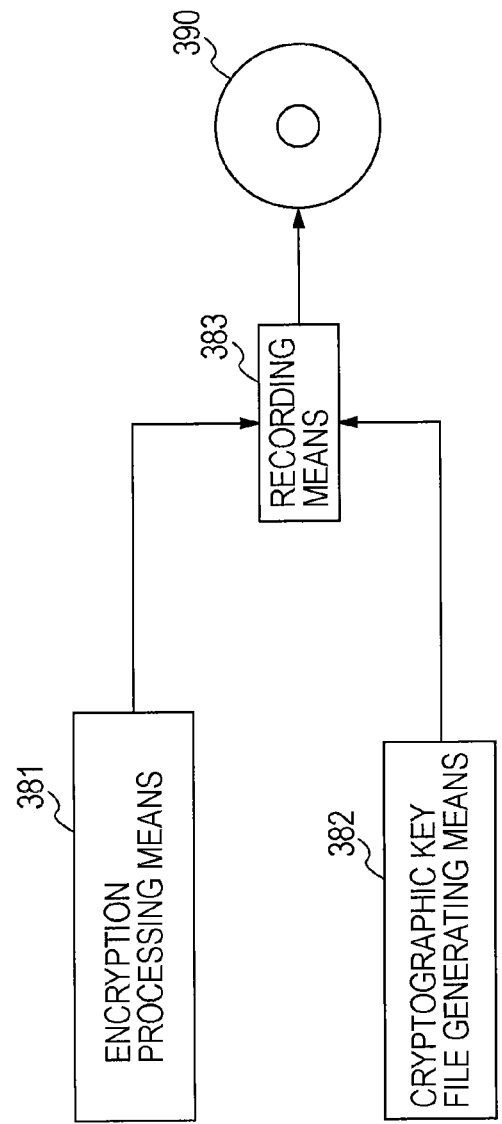

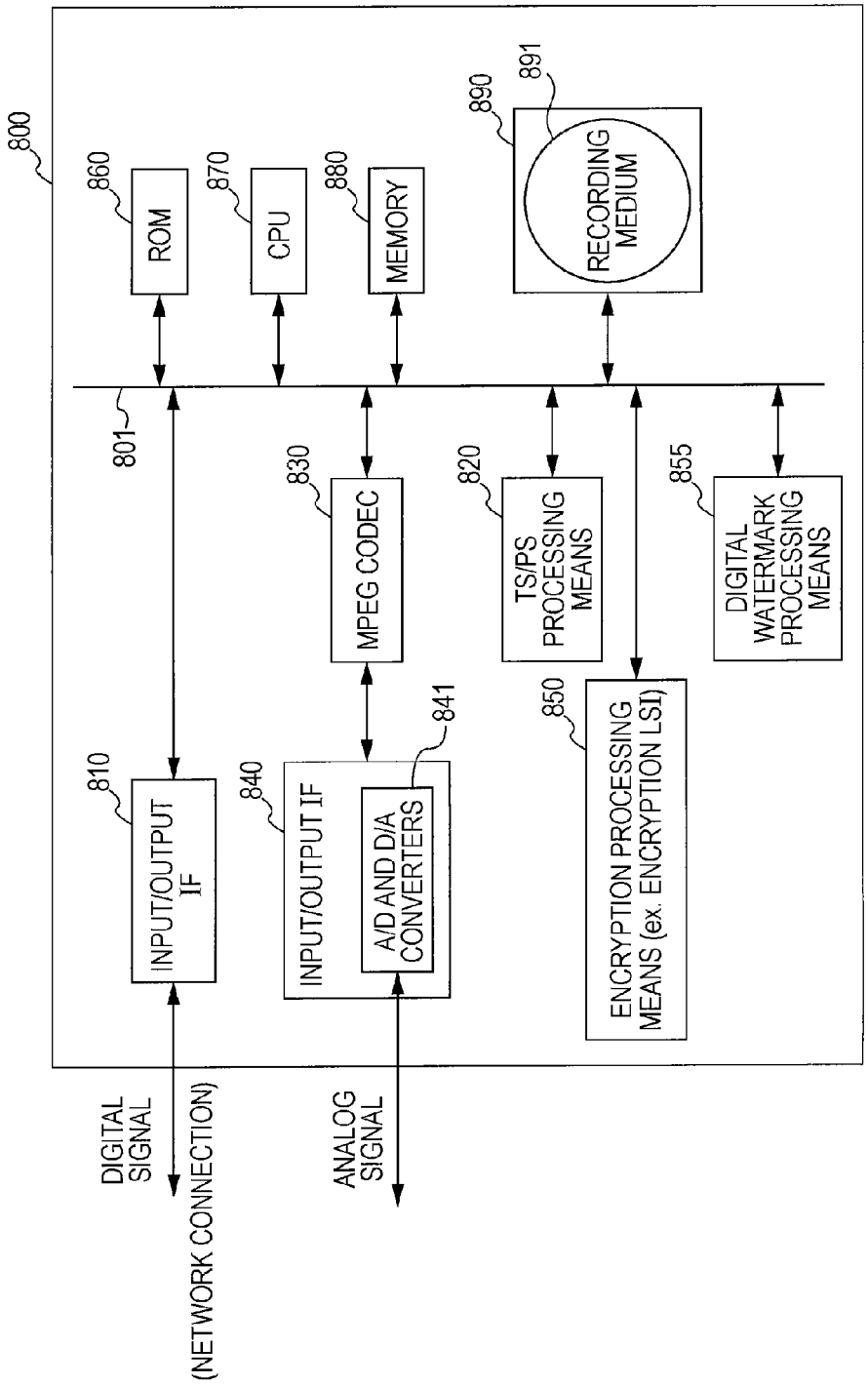

INFORMATION PROCESSING APPARATUS, INFORMATION RECORDING MEDIUM MANUFACTURING APPARATUS, INFORMATION RECORDING MEDIUM, METHOD, AND COMPUTER PROGRAM

CROSS REFERENCE TO RELATED APPLICATIONS

The present application claims priority to Japanese Patent Application JP 2005-051630, filed on Feb. 25, 2005, the entire contents of which is being incorporated herein by reference.

BACKGROUND

The present disclosure relates to information processing apparatuses, information recording media manufacturing apparatuses, information recording media, methods, and computer programs. More particularly, the invention relates to an information processing apparatus, an information recording medium manufacturing apparatus, an information recording medium, a method, and a computer program that eliminate the unauthorized use of content and implement strict content usage management.

Various software data (hereinafter referred to as "content"), such as audio data, e.g., music, image data, e.g., movies, game programs, and various application programs, can be stored on recording media, for example, Blu-ray discs using blue laser light, DVDs (Digital Versatile Discs), MDs (Mini Discs), CDs (Compact Discs), as digital data. In particular, Blu-ray discs using blue laser light are high-density recording discs and can record a large volume of video content as high quality image data.

Digital content is stored in various information recording media described above and is provided to users. A user uses the digital content by playing it back on the user's PC (Personal Computer) or a player, such as a disc player.

Generally, the distribution rights of many content data, such as music data and image data, are owned by creators or sellers of such content data. Basically, therefore, certain usage restrictions are imposed when distributing content, that is, unauthorized copying is prevented by allowing the use of content only for authorized users.

According to digital recording apparatuses and recording media, images and sound can be repeatedly recorded and played back without a loss in quality. Thus, the distribution of illegally copied content via the Internet, the circulation of recording media, such as CD-R discs, recording copied content thereon, so-called "pirated discs", and the use of copied content stored in hard disks of, for example, PCs are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data, such as, video data or sound data, encrypted and recorded on, for example, a DVD-ROM (Read Only Memory) can be descrambled for playing back the content.

In descramble processing, it is necessary to execute processing using specific data, such as a key, provided for licensed DVD players. A license is given to DVD players that are designed in compliance with predetermined operation rules, for example, agreeing not to perform unauthorized copying. Accordingly, licensed DVD players can descramble data recorded on a DVD-ROM by using specific data, for example, a given key, to play back images or sound from the DVD-ROM.

On the other hand, an unlicensed DVD player cannot play back data recorded on the DVD-ROM since it does not have a key for descrambling the scrambled data. In this manner, in the content scrambling system, DVD players that do not satisfy conditions demanded for receiving a license cannot play back digital data from the DVD-ROM, thereby preventing unauthorized copying.

However, such a content scrambling system is not a perfect system, and there are many content scrambling systems whose descrambling methods have already been deciphered and are distributed via communication means, such as the Internet. In this manner, once scrambling methods are deciphered, content is illegally played back or copied by unauthorized descramble processing, and the copyright or the right to use content is violated. Assuming that there is no perfect system, key revoking techniques are available as the countermeasures against deciphering scrambling methods. In those techniques, to revoke keys, it is necessary to identify in which devices hacking has occurred, and a method for tracing such devices is known as "traitor tracing", as disclosed in the following patent publication.

However, in the method disclosed in the WO01/45410 reference, one screen is divided into a plurality of segments, which makes the management of keys complicated and also makes it difficult to speedily perform a playback operation. In WO01/45410, a specific configuration is not disclosed nor does it disclose how a playback order is determined.

SUMMARY

In one embodiment, an information processing apparatus, an information recording medium, an information processing method, and a computer program that eliminate the unauthorized use of content to implement strict content usage management and that specify devices performing unauthorized copying of content is provided.

More particularly, an embodiment provides an information processing apparatus, an information recording medium, an information processing method, and a computer program having a configuration in which a segment, which serves as a content recording unit of the information recording medium, is formed of a plurality of variations using different cryptographic keys, and only a specific playback sequence, which is set by selecting specific variations, can be decrypted, a unit classification number, which is associated with a path as a playback sequence, can be associated with various units, such as a content management unit or an index unit, thereby making it possible to set paths based on various units and implementing the content usage management based on the various units.

In an embodiment, there is provided an information processing apparatus for executing processing for generating recording data to be recorded on an information recording medium, including encrypt processing means for executing processing for encrypting content. The encrypt processing means generates encrypted data having different variations by encrypting a segment portion which forms the content by using a plurality of segment keys and encrypts a non-segment portion, which is different from the segment portion, by using a unit key set for a content management unit, which serves as a base unit for using the content. The encrypt processing means encrypts the content by changing a combination of the segment keys used for encrypting the segment portion in accordance with a unit classification number set for the content.

A second aspect includes an information recording medium manufacturing apparatus including: encrypt processing means for executing processing for encrypting content; cryptographic key file generating means for generating a cryptographic key file including cryptographic key information used for encrypting the content; and recording means for recording the encrypted content generated by the encrypt processing means and the cryptographic key file generated by the cryptographic key file generating means. The encrypt processing means generates encrypted data having different variations by encrypting a segment portion which forms the content by using a plurality of segment keys and encrypts a non-segment portion, which is different from the segment portion, by using a unit key set for a content management unit, which serves as a base unit for using the content, and the encrypt processing means encrypts the content by changing a combination of the segment keys used for encrypting the segment portion in accordance with a unit classification number set for the content. The cryptographic key file generating means generates the cryptographic key file in which unit key generating information concerning the generation of the unit key associated with the content management unit and a unit classification number, which serves as identification information concerning a combination of the segment keys used for encrypting the segment portion are recorded.

According to a third aspect, there is provided is an information processing apparatus for decrypting and playing back encrypted content recorded on an information recording medium, including: cryptographic key file analyzing means for obtaining a key used for decrypting the content from a cryptographic key file including cryptographic key information used for encrypting the content; and encrypt processing means for executing processing for decrypting the content by using the cryptographic key obtained on the basis of an analysis of the cryptographic key file analyzing means. The cryptographic key file analyzing means obtains, from the cryptographic key file, unit key generating information concerning the generation of a unit key associated with a content management unit, which serves as a base unit for using the content, and a unit classification number, which serves as identification information concerning a combination of segment keys used for decrypting a segment portion forming the content. The encrypt processing means obtains the unit key and the segment keys used for decrypting the content from the unit key generating information and the unit classification number obtained by the cryptographic key file analyzing means, and decrypts the content on the basis of the obtained unit key and segment keys.

According to a fourth aspect, there is provided is an information recording medium storing encrypted content and a cryptographic key file including cryptographic key information used for encrypting the content. The encrypted content includes a segment portion forming the encrypted data having different variations generated by using a plurality of segment keys, and a non-segment portion, which is different from the segment portion, generated by using a unit key set for a content management unit, which is a base unit for using the content, a combination of the segment keys used for encrypting the segment portion being different in accordance with a unit classification number set for the content. The cryptographic key file records thereon unit key generating information concerning the generation of the unit key associated with the content management unit, and the unit classification number, which serves as identification information concerning the combination of the segment keys used for encrypting the segment portion. The unit key generating information and the unit classification number may be recorded on the same file or may be recorded on different files.

According to a fifth embodiment, there is provided is an information processing method for generating recording data to be recorded on an information recording medium, including an encrypt processing step of executing processing for encrypting content. The encrypt processing step generates encrypted data having different variations by encrypting a segment portion which forms the content by using a plurality of segment keys and encrypts a non-segment portion, which is different from the segment portion, by using a unit key set for a content management unit, which serves as a base unit for using the content, and the encrypt processing step encrypts the content by changing a combination of the segment keys used for encrypting the segment portion in accordance with a unit classification number set for the content.

According to a sixth aspect, there is provided is an information recording medium manufacturing method including: an encrypt processing step of encrypting content; a cryptographic key file generating step of generating a cryptographic key file including cryptographic key information used for encrypting the content; and a recording step of recording the encrypted content generated in the encrypt processing step and the cryptographic key file generated in the cryptographic key file generating step. The encrypt processing step generates encrypted data having different variations by encrypting a segment portion which forms the content by using a plurality of segment keys, and encrypts a non-segment portion, which is different from the segment portion, by using a unit key set for a content management unit, which serves as a base unit for using the content, and the encrypt processing step encrypts the content by changing a combination of the segment keys used for encrypting the segment portion in accordance with a unit classification number set for the content. The cryptographic key file generating step generates the cryptographic key file in which unit key generating information concerning the generation of the unit key associated with the content management unit and a unit classification number, which serves as identification information concerning the combination of the segment keys used for encrypting the segment portion are recorded.

According to a seventh aspect, there is provided is an information processing method for decrypting and playing back encrypted content recorded on an information recording medium, including: a cryptographic key file analyzing step of obtaining a key used for decrypting the encrypted content from a cryptographic key file including cryptographic key information used for encrypting the content; and an encrypt processing step of decrypting the content by using the cryptographic key obtained on the basis of an analysis of the cryptographic key file analyzing step. The cryptographic key file analyzing step obtains, from the cryptographic key file, unit key generating information concerning the generation of a unit key associated with a content management unit, which serves as a base unit for using the content, and a unit classification number, which serves as identification information concerning a combination of segment keys used for decrypting a segment portion which forms the content. The encrypt processing step obtains the unit key and the segment keys used for decrypting the content from the unit key generating information and the unit classification number information obtained in the cryptographic key file analyzing step, and decrypts the content on the basis of the obtained unit key and segment keys.

According to an eighth aspect, there is provided is a computer program allowing a computer to execute processing for generating recording data to be recorded on an information recording medium, including an encrypt processing step of executing processing for encrypting content. The encrypt processing step generates encrypted data having different variations by encrypting a segment portion which forms the content by using a plurality of segment keys and encrypts a non-segment portion, which is different from the segment portion, by using a unit key set for a content management unit, which serves as a base unit for using the content, and the encrypt processing step encrypts the content by changing a combination of the segment keys used for encrypting the segment portion in accordance with a unit classification number set for the content.

According to a ninth aspect, there is provided is a computer program allowing a computer to execute processing for decrypting and playing back encrypted content recorded on an information recording medium, including: a cryptographic key file analyzing step of obtaining a key used for decrypting the encrypted content from a cryptographic key file including cryptographic key information used for encrypting the content; and an encrypt processing step of decrypting the content by using the cryptographic key obtained on the basis of an analysis of the cryptographic key file analyzing step. The cryptographic key file analyzing step obtains, from the cryptographic key file, unit key generating information concerning the generation of a unit key associated with a content management unit, which serves as a base unit for using the content, and a unit classification number, which serves as identification information concerning a combination of segment keys used for decrypting a segment portion which forms the content. The encrypt processing step obtains the unit key and the segment keys used for decrypting the content from the unit key generating information and the unit classification number information obtained in the cryptographic key file analyzing step, and decrypts the content on the basis of the obtained unit key and segment keys.

According to a tenth aspect, there is provided is a data structure that manages encrypted content and key data. The encrypted content includes a non-segment portion encrypted on the basis of unit key generating information concerning the generation of a unit key associated with a content management unit, which serves as a base unit for using the content, and a plurality of segment portions appearing to be the same when being played back, and having different digital watermarks embedded on the plurality of segment portions and being encrypted with different segment keys. The key data includes the unit key generating information corresponding to the non-segment portion, key information corresponding to each of the plurality of segment portions, a unit classification number, which serves as identification information concerning a combination of the segment keys, and a plurality of playlists, each specifying, in accordance with the unit classification number, one play item which designates a playback range by a playback time and which is set for each of a plurality of segments included in the segment portion.

The computer programs of the present embodiments are computer programs that can be provided via a computer-readable storage medium, such as a CD, a FD, or a MO, or a computer-readable communication medium, such as a network, to a computer system that can execute various program codes. By providing such programs in a computer-readable format, processing can be executed on a computer system in accordance with the programs.

Other objects, features, and advantages will become clear from the following detailed description, and the accompanying drawings. In this specification, the system is a logical set of a plurality of apparatuses, and it is not essential that the apparatuses be in the same housing.

According to an embodiment, a unit classification number which defines a playback path of content including encrypted data having different variations generated by encrypting a segment portion, which forms content, by using a plurality of segment keys and encrypted data generated by encrypting a non-segment portion by using a unit key can be set based on various units, such as based on a content management unit and an index. The settings of the unit classification numbers are indicated in a CPS unit key file storing key generating information concerning the generation of a key associated with a CPS unit, which is a content management unit. Based on the CPS unit key file, the unit classification number for content to be played back can be obtained. With this configuration, the settings of paths based on various units and the content usage management based on various units can be implemented.

According to an embodiment, the settings of the unit classification numbers are indicated in a CPS unit key file storing key generating information concerning the generation of a key associated with a CPS unit, which is a content management unit. Based on the CPS unit key file, the unit classification number for content to be played back can be obtained. Accordingly, in the playback processing, by obtaining the unit classification number indicated in the CPS unit key file, a necessary key can be obtained regardless on which base unit the unit classification number is set. That is, a unit classification number, i.e., a path, can be set based on various units, such as based on each CPS unit or an index, such as a title. Alternatively, a plurality of unit classification numbers may be set for a CPS unit. Thus, the content usage management based on various units can be implemented.

BRIEF DESCRIPTIONS OF THE FIGURES

FIG. 5 illustrates the configuration of a CPS unit key file.

FIG. 7 illustrates the configuration of a segment key file.

FIG. 8 is a syntax diagram illustrating the configuration of a segment key file.

FIG. 9 illustrates the configuration of a segment key file.

FIG. 10 illustrates the configuration of a unit classification key file.

FIG. 14 illustrates a first example of the structure of a CPS unit key file.

FIG. 15 is a syntax diagram illustrating the first example of the structure of the CPS unit key file.

FIG. 16 illustrates a second example of the structure of a CPS unit key file.

FIG. 17 is a syntax diagram illustrating the second example of the structure of the CPS unit key file.

FIG. 18 illustrates a third example of the structure of a CPS unit key file.

FIG. 19 is a syntax diagram illustrating the third example of the structure of the CPS unit key file.

FIG. 20 is a block diagram illustrating the functional configuration of an information processing apparatus that encrypts and records content.

FIG. 27 illustrates an example of the configuration of an information processing apparatus that records or plays back information on or from an information recording medium.

DETAILED DESCRIPTION

Details of an information processing apparatus, an information recording medium, an information processing method, and a computer program of the present invention are described below with reference to the drawings. A description is given in the order of the following sections.

1. Overview of Storage Data of Information Recording Medium and Information Processing Apparatus 2. Detailed Configuration of Storage Data of Information Recording Medium and Storage Data of Information Processing Apparatus (2.1. CPS Unit)
  (2.2. Segment)
  (2.3. CPS Unit Key File)
  (2.4. Segment Key File)
  (2.5. Unit Classification Key File)
  (2.6. Movie Object)

3. Setting of Unit Classification Numbers (3.1. Setting of Unit Classification Number for Each CPS Unit)
  (3.2. Setting of Unit Classification Number for Each Index, Such as Title)
  (3.3. Setting of Plural of Unit Classification Numbers for Each CPS unit)

4. Content Playback Processing in Information Processing Apparatus

5. Example of Configuration of Information Processing Apparatus

[1. Overview of Storage Data of Information Recording Medium and Information Processing Apparatus]

Figure 1:
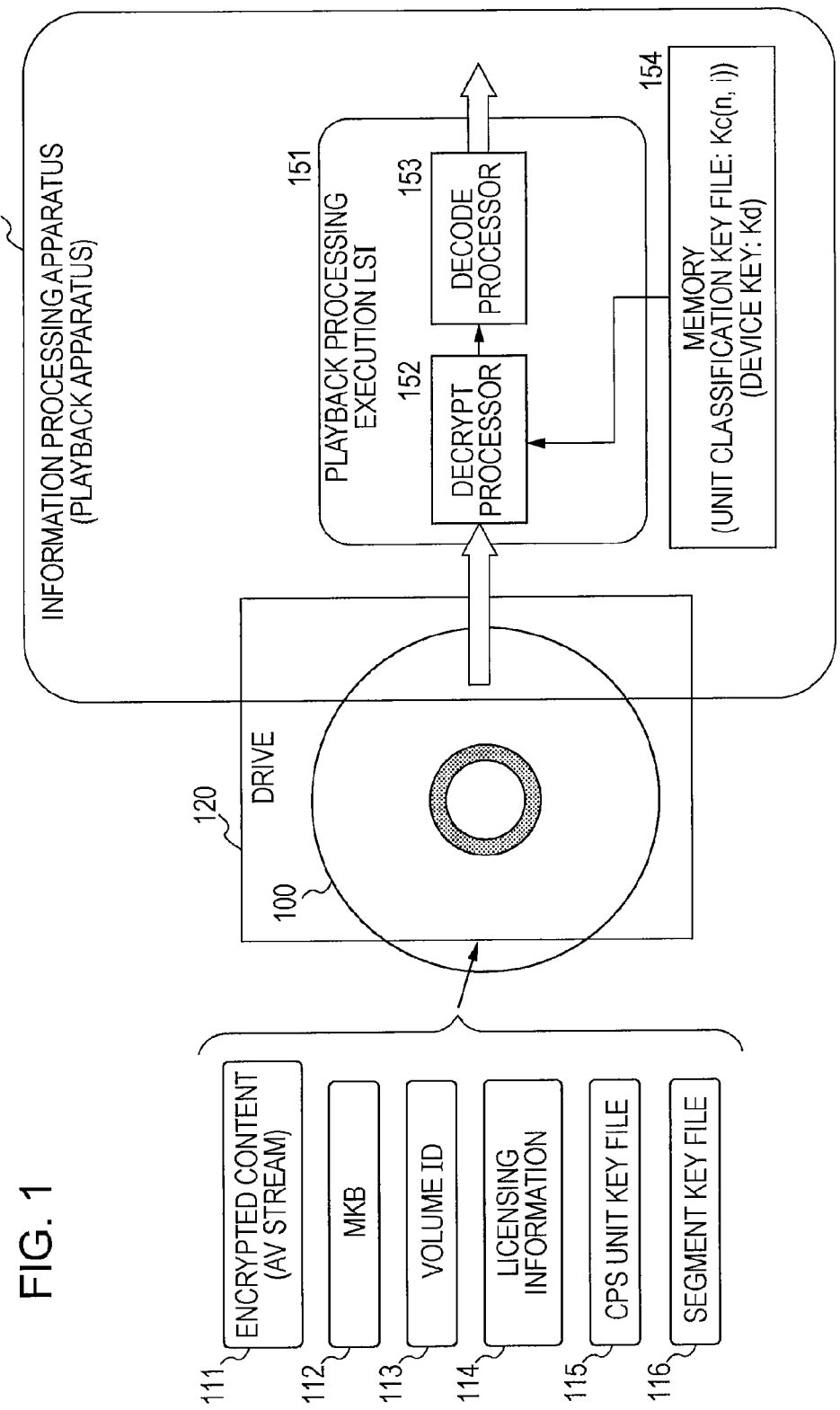
FIG. 1 illustrates the data structure stored in an information recording medium, and the configuration and processing of an information processing apparatus that performs playback processing.

An overview of storage data of an information recording medium and an information processing apparatus is first discussed. In FIG. 1, the configuration of an information processing medium 100 and an information processing apparatus (playback apparatus) 150 storing content therein is shown. In FIG. 1, an example of information stored in a ROM disc as a content storage disc is shown. The information processing apparatus 150 is, for example, a PC or a playback-only device, and includes a drive 120 for reading data from the information recording medium 100.

A ROM disc as the information recording medium 100, which is an information recording medium, such as a Blu-ray disc or a DVD, storing authorized content, is manufactured in a disc manufacturing factory with the permission of a so-called "content right holder" having an authorized content copyright or distribution right. In the following embodiment, as the information recording medium, a disc medium is used. However, the present embodiments are applicable to configurations using various information recording media.

The information recording medium 100 stores, as shown in FIG. 1, encrypted content 111 subjected to encrypt processing, a MKB (Media Key Block) 112, which serves as a cryptographic key block, generated based on a tree-structure key distribution system known as one mode of a broadcast encryption system, a volume ID 113, which is set as identification information for each information recording medium or a predetermined number of information recording media, licensing information 114 including CCI (Copy Control Information) as content copy/playback control information, a content management unit (CPS) unit key file 115 storing a CPS unit key, which is a cryptographic key set for each CPS unit, which is a content usage management unit, and a segment key file 116, which is a file for obtaining segment keys used as cryptographic keys for segment data generated by encrypting part of the content stored in the information recording medium 100 with the different cryptographic keys. An overview of various items of information is discussed below.

(1) Encrypted Content 111

In the information recording medium 100, various items of content data, such as AV (Audio Visual) streams of moving picture content, for example, HD (High Definition) movie content, game programs, image files, sound data, and text data, defined by specific standards, are stored. Those items of content are specific AV format standard data, which are stored according to specific AV data formats. More specifically, for example, content is stored as the Blu-ray Disc™ ROM standard data according to the Btu-ray Disc™ ROM standard format. Those items of content are referred to as "main content".

Game programs, image files, sound data, or text data, which serve as service data, may be stored as sub-content. The sub-content is data having a data format which is not compliant with a specific AV data format. That is, such data can be stored as Blu-ray Disc™ ROM nonstandard data according to a certain format which is not compliant with the Blu-ray Disc™ ROM standard format. Those items of content are referred to as "sub-content".

As the types of content, both the main content and the sub-content include various content, such as music data, image data, for example, moving pictures and still images, game programs, and WEB content. Such content include various modes of information, such as content information that can be used only by data from the information recording medium 100, and content information that can be used by a combination of the data from the information recording medium 100 and data provided from a server connected to the recording medium 100 via a network. To individually control the use of each segment of content, the content stored in the information recording medium is stored by assigning different keys (title keys) to segments and by encrypting each segment with a key (title key), which is different from those for the other segments. The unit to which one title key is assigned is referred to as a "content management unit (CPS unit)".

(2) MKB

The MKB (Media Key Block) 112 is a cryptographic key block generated based on a tree-structure key distribution system known as one mode of the broadcast encryption method. The MKB 111 is a key information block that makes it possible to obtain a media key (Km), which is, a key necessary for decrypting content, only by processing (decryption) on the basis of a device key (Kd) stored in information processing apparatuses having valid licenses. The MKB is based on an information distribution system according to a so-called hierarchical tree structure. The MKB makes it possible to obtain the media key (Km) only when a user device (information processing apparatus) has a valid license, and to disable revoked user devices from obtaining the media key (Km).

By changing the device key used for encrypting key information stored in the MKB, a management center, which serves as a license entity, can generate a MKB that disables a device key stored in a specific user device from decrypting content, that is, makes the user device unable to obtain the media key necessary for decrypting the content. It is thus possible to provide encrypted content only to devices having valid licenses while revoking unauthorized devices at a suitable time. Content decrypt processing is discussed below.

(3) Volume ID

The volume ID is an ID set as identification information for each information recording medium or a predetermined number of information recording media. The volume ID is used as information for generating a key for decrypting content. The processing using the volume ID is discussed below.

(4) Licensing Information

Licensing information includes, for example, copy/playback control information (CCI), that is, copy restriction information or playback restriction information used for controlling the use of the encrypted content 111 stored in the information recording medium 100. The copy/playback control information (CCI) may be set in various manners, such as being set for each CPS unit set, which serves as the content management unit, or for a plurality of CPS units. Details of the licensing information are given in the following section.

(5) CPS Unit Key File

The encrypted content 111 stored in the information recording medium 100 is encrypted by a unique cryptographic key, which is used for the corresponding CPS unit set as the content management unit, as described above. AV (Audio Visual) streams, music data, image data, such as moving pictures and still images, game programs, and WEB content forming content are segmented into CPS units serving as content usage management units. It is necessary that an information processing apparatus to perform playback processing determine the CPS unit to which the content to be played back belongs, and perform decrypt processing by using the CPS unit key as the cryptographic key corresponding to the determined CPS unit. The file storing data necessary for obtaining the CPS unit key is the CPS unit key file. Details of the CPS unit key file are given below. To play back content, not only the CPS unit key, but also various other key information and key generation information, should be applied. Specific processing of such information is also discussed below.

(6) Segment Key File

As stated above, the content stored in the information recording medium 100 is encrypted and stored on the basis of CPS units. Moreover, content belonging to one CPS unit includes segment data formed of a plurality of variations generated by encrypting part of the content with different cryptographic keys. The segment key file is a file for obtaining the segment keys used as the cryptographic keys for encrypting the segment data.

An information processing apparatus to perform playback processing plays back content in accordance with a specific path (sequence) set by selecting specific segment data from each of the plurality of segments of the content. The file for storing data for obtaining segment keys for decrypting segment data (encrypted data) having a specific variation, which is set for each segment, is the segment key file. For playing back content, it is necessary to obtain a plurality of CPS unit keys and a plurality of segment keys based on a specific path (sequence).

That is, to play back content, it is necessary to decrypt content by switching CPS unit keys and segment keys corresponding to specific variations of segment data. A key string of segment keys based on a specific path is referred to as a "sequence key". Details of obtaining and using the segment key file and the segment keys are discussed below.

FIG. 1 illustrates the schematic configuration of the information processing apparatus 150 executing playback processing for the content stored in the information recording medium 100. The information processing apparatus includes the drive 120 for reading data stored in the information recording medium. The data read by the drive 120 is input into a playback processing execution LSI 151 that decrypts and decodes (for example, MPEG-decodes) encrypted content.

The playback processing execution LSI 151 includes a decrypt processor 152 for executing decrypt processing on encrypted content and a decode processor 153 for executing decode (for example, MPEG-decode) processing on the encrypted content. The decrypt processor 152 generates a key for decrypting content by using various information stored in a memory 154 and the data read from the information recording medium 100, and then executes decrypt processing on the encrypted content 111.

In the memory 154, a unit classification key file: Kc (n, i) and a device key: Kd are stored. When decrypting encrypted content of the information recording medium 100, the information processing apparatus 150 generates a key for decrypting the content on the basis of the data stored in the memory 154 and the data read from the information recording medium 100, and then executes decrypt processing on the encrypted content 111. Details of the data stored in the memory and decrypt processing are discussed in the following section.

[2. Detailed Configuration of Storage Data of Information Recording Medium and Storage Data of Information Processing Apparatus]

Figure 2:
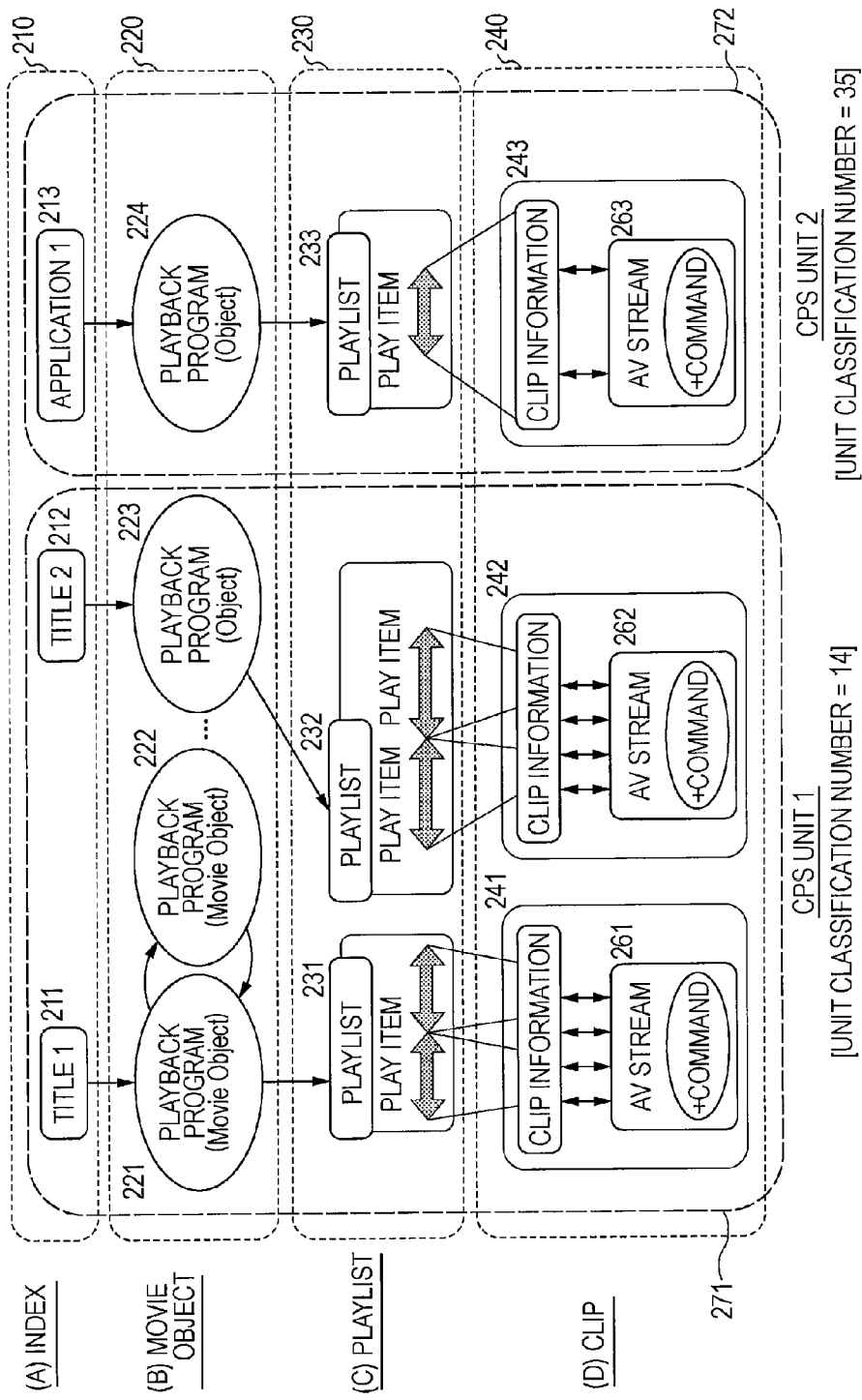
FIG. 2 illustrates examples of setting content management units for content stored in an information recording medium.

A description is now given of the detailed configuration of data stored in an information recording medium with reference to FIG. 2 and other drawings.

(2.1. CPS Unit)

As stated above, to control the use of content based on different content units, content stored in an information recording medium is encrypted and stored by assigning different keys to content units. That is, the content is segmented into content management units (CPS units), and the CPS units are individually encrypted and usage control is performed for the individual CPS units.

To use content, it is necessary to first obtain a CPS unit key assigned to each unit, and then, by using the CPS unit key and other required keys and key generation information, data processing based on a predetermined decrypt processing sequence is executed to play back content. Modes for setting content management units (CPS units) are discussed below with reference to FIG. 2.

Content has, as shown in FIG. 2, a hierarchical structure including (A) an index 210, (B) a movie object 220, (C) a playlist 230, and (D) a clip 240. When designating an index, such as a title, accessed by a playback application, a playback program associated with the title is designated, and a playlist defining, for example, a content playback order, is selected according to program information concerning the designated playback program.

The index 210 includes various indexes, such as titles, which serve as application index files, containing content titles to be displayed on a display unit of a content playback device, applications, such as game content and WEB content, first playback (First Playback), which serves as playback content index information to be started when an information recording medium (disc) is installed in a drive, and a top menu (Top Menu), which serves as index information concerning content to be played back, displayed when a menu display function is started. Only titles and applications are shown in FIG. 2.

A playlist includes play items as information concerning data to be played back. According to clip information as a playback zone defined by the play items contained in the playlist, AV streams or commands as real content data are selectively read to play back the AV streams or to execute the commands. There are a plurality of playlists or a plurality of play items, and playlist IDs or play item IDs are associated with the playlists or play items as identification information.

FIG. 2 shows two CPS units, which form part of content stored in an information recording medium. Each of a CPS unit 1, 271 and a CPS unit 2, 272 includes a title as an index, a movie object as a playback program file, a playlist, and an AV stream file as real content data.

The content management unit (CPS unit) 1, 271 includes a title 1, 211 and a title 2, 212, playback programs 221 and 222, playlists 231 and 232, and clips 241 and 242. At least AV stream data files 261 and 262, which serve as real content data, contained in the two clips 241 and 242, respectively, are data to be encrypted, and are basically set as data encrypted with a CPS unit key (Ku1), which is a cryptographic key associated with the content management unit (CPS unit) 1, 271. Segments, which are data forming content, are encrypted with segment keys, and details of segments are given below. Content is divided into segment portions and non-segment portions, and the non-segment portions are encrypted with the CPS unit key, and the segment portions are formed of a plurality of variations, which include segment data encrypted with different segment keys. The configurations of the non-segment portions and segment portions are discussed in detail in the following section.

A unit classification number (Movie Sequence Number) is set in each content management unit (CPS unit). The unit classification number is any number that can be determined by a content owner, which is a content providing entity, or an authoring facility, which is a content editing entity, and for example, 255 numbers from 0 to 254, are provided. The unit classification number is used as a parameter for determining the content playback path. The content playback path is described in detail in the following section with reference to FIG. 3 and other drawings. In the example shown in FIG. 2, the unit classification number 14 is set for the content management unit (CPS unit) 1, 271, as indicated in the bottom-most section of FIG. 1.

The content management unit (CPS unit) 2, 272 includes an application 1, 213 as an index, a playback program 224, a playlist 233, and a clip 243. An AV stream data file 263, which is real content data, contained in the clip 243 is encrypted with a CPS unit key (Ku2), which is a cryptographic key associated with the content management unit (CPS unit) 2, 272. A unit classification number 35 is set for the content management unit (CPS unit) 2, 272.

To execute an application file or content playback processing corresponding to the content management unit 1, 271, the user has to obtain the unit key: Ku1, which is a cryptographic key associated with the content management unit (CPS unit) 1, 271 and to perform decrypt processing with the unit key: Ku1. To execute an application file or content playback processing corresponding to the content management unit 2, 272, the user has to obtain the unit key: Ku2, which is a cryptographic key associated with the content management unit (CPS unit) 2, 272 and to perform decrypt processing with the unit key: Ku2.

As stated above, the unit classification number (Movie Sequence Number) is set for each CPS unit. Alternatively, the unit classification number (Movie Sequence Number) may be set for each index, such as a title, or a plurality of unit classification numbers (Movie Sequence Numbers) may be set for each CPS unit. Examples of setting unit classification numbers are described in Section [3. Setting of Unit Classification Numbers]. In this section [2. Detailed Configuration of Storage Data of Information Recording Medium and Storage Data of Information Processing Apparatus], it is assumed that the unit classification number (Movie Sequence Number) is set for each CPS unit.

(2.2 Segment)

In content playback processing, it may be necessary that not only unit keys, but also segment keys (Ks) corresponding to divided segments forming data, be obtained. The configuration of segments is discussed below with reference to FIG. 3.

Figure 3:
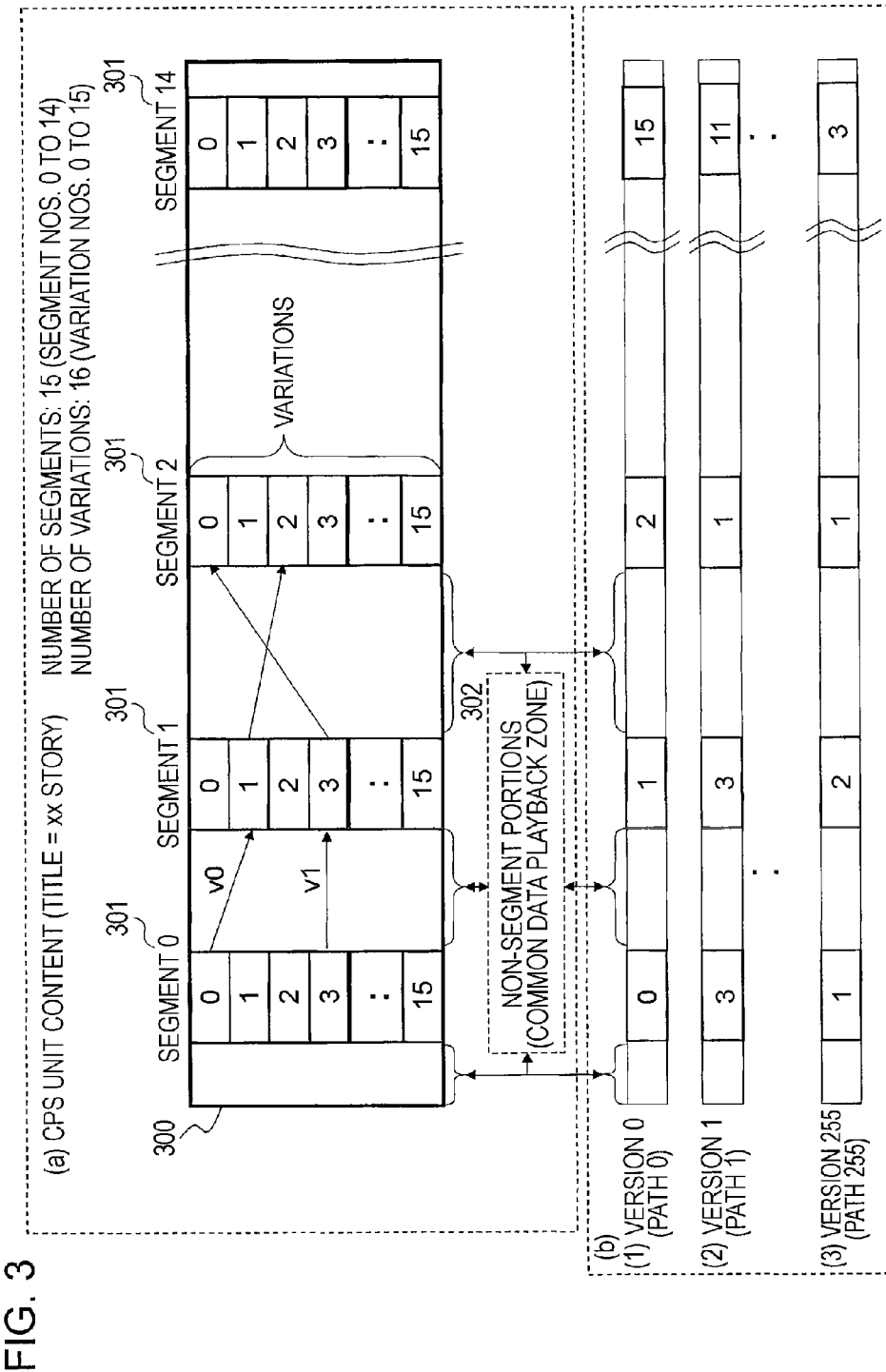
FIG. 3 illustrates the configuration of segments to be set for content.

FIG. 3(*a*) illustrates the data structure of one piece of content belonging to a content management unit (CPS unit) stored in an information recording medium. Content 300 is, for example, one piece of movie content which forms title [OX story]. The content 300 includes, as shown in FIG. 3(*a*), a plurality of segment portions 301 and a plurality of non-segment portions 302.

For easy understanding, it is now assumed that the playback data is stored along the playback time axis from the left to the right in FIG. 3. An information processing apparatus to play back the content alternately plays back non-segment portions and segment portions. The non-segment portions 302 are content portions that can be played back by obtaining the above-described unit key (Ku), i.e., content portions that can be played back by being decrypted with the obtained unit key (Ku), which is common for all information processing apparatuses.

On the other hand, it is necessary that the segment portions 301 be decrypted by obtaining keys different from the above-described unit key (Ku), i.e., segment keys (Ks) associated with the variations of the segments. The number of segments in one piece of content is, for example, as shown in FIG. 3, 15 from 0 to 14. Each of the plurality of segment portions 301 is formed of segment data having 16 variations from 0 to 15.

The 16 segment data contained in each segment portion 301 indicate all the same data (for example, the same playback image scene of a movie for several seconds). For example, the 16 segment data contained in segment 0 store the scene after the non-segment portion 302 located before segment 0 (at the left of segment 0 in FIG. 3).

The 16 segment data having variations 0 to 15 contained in segment 0 indicate data associated with the same scene, but are encrypted with different segment keys [Ks (0, 0) through Ks (0, 15)].

If the segment key is indicated by Ks(x, y), x represents the segment number and y designates the variation number. That is, the segment key Ks(x, y) is a segment key having a segment number x and a variation number y. All the segment data (15×16=240) contained in segment 0 to segment 14 shown in FIG. 3 are data encrypted with segment keys [Ks(0, 0) through Ks(14, 15)] associated with the corresponding segment data.

An information processing apparatus to play back content can decrypt only one segment data selected from the 16 segment data having variations 0 to 15 contained in segment 0. For example, information processing apparatus A can obtain only one segment key [Ks(0, 0)] from the segment keys [Ks(0, 0) through Ks(0, 15)], and information processing apparatus B can obtain only one segment key [Ks(0, 3)] from the segment keys [Ks(0, 0) through Ks(0, 15)].

Similarly, the 16 segment data having variations 0 to 15 contained in segment 1 indicate data generated by encrypting a common scene with different segment keys [Ks(1, 0) through Ks(1, 15)]. Also concerning the 16 segment data having variations 0 to 15 contained in segment 1, an information processing apparatus can decrypt only one segment data selected from the 16 segment data having variations 0 to 15 contained in segment 1. For example, information processing apparatus A can obtain only one segment key [Ks(1, 1)] from the segment keys [Ks(1, 0) through Ks(1, 15)], and information processing apparatus B can obtain only one segment key [Ks(1, 3)] from the segment keys [Ks(1, 0) through Ks(1, 15)].

When performing content playback processing, each information processing apparatus obtains the version number associated with each CPS unit based on the unit classification number set for the CPS unit and the unit classification key file: Kc(n, i) stored in the memory of the information processing apparatus, and obtains a playlist recording a path to be played back based on the obtained version number, thereby performing playback processing. The processing for obtaining the playlist based on the version number is performed by executing a movie object program as the playback program (see FIG. 2) belonging to the CPS unit. The configuration of the movie object is discussed in the following section.

As the path that can be played back by each information processing apparatus, the sole path is determined based on the version number associated with the CPS unit determined by the information processing apparatus. The arrows v0 and v1 shown in FIG. 3(a) respectively indicate an example of the path set by the information processing apparatus that has obtained the version number 0(v0) associated with the CPS unit to which this content (OX story) belongs and an example of the path set by the information processing apparatus that has obtained the version number 1(v1). That is, the playback path is determined by the version.

In the example shown in FIG. 3, the information processing apparatus having version 0(v0) selects data of variation number 0 in segment 0 and selects data of variation number 1 in segment 1, and decrypts the data with the corresponding segment keys. The selected data can be represented by the playback sequence indicated in (1) of FIG. 3(b). The information processing apparatus having version 1(v1) selects data of variation number 3 in segment 0 and selects data of variation number 3 in segment 1, and decrypts the data with the corresponding segment keys. The selected data can be represented by the playback sequence indicated in (2) of FIG. 3(b). Concerning the non-segment portions, all information processing apparatuses obtain the common key (CPS Unit key (Ku)) to decrypt the same data.

Although in FIG. 3(b), for the sake of convenience, the version number and the path number are the same, they do not have to be the same. In FIG. 3(b), the path set for version 0 is path number 0, and the path set for version 1 is path number 1. If the number of segments is 15 and if the number of variations is 16, $16^{15}$ different paths can be set.

As in the number of paths, $16^{15}$ different versions can be set. That is, different versions for each piece of content may be set for individual information processing apparatuses. Alternatively, for a certain CPS unit, one version may be set for information processing apparatuses having the same machine type. That is, for one CPU unit, the same version is set for information processing apparatuses having the same machine type.

Although in reality $16^{15}$ different versions can be set, the amount of data becomes enormous if playlists including all the playback paths are recorded. Accordingly, 256 versions from 0 to 255, i.e., 256 playlists, are set in the following example.

As shown in FIG. 3(b), an information processing apparatus that has obtained 256 versions from version 0 to version 255 for a certain piece of content performs a playback operation according to the different paths from path 0 to path 255. At least those 256 paths are set differently.

Figure 4:
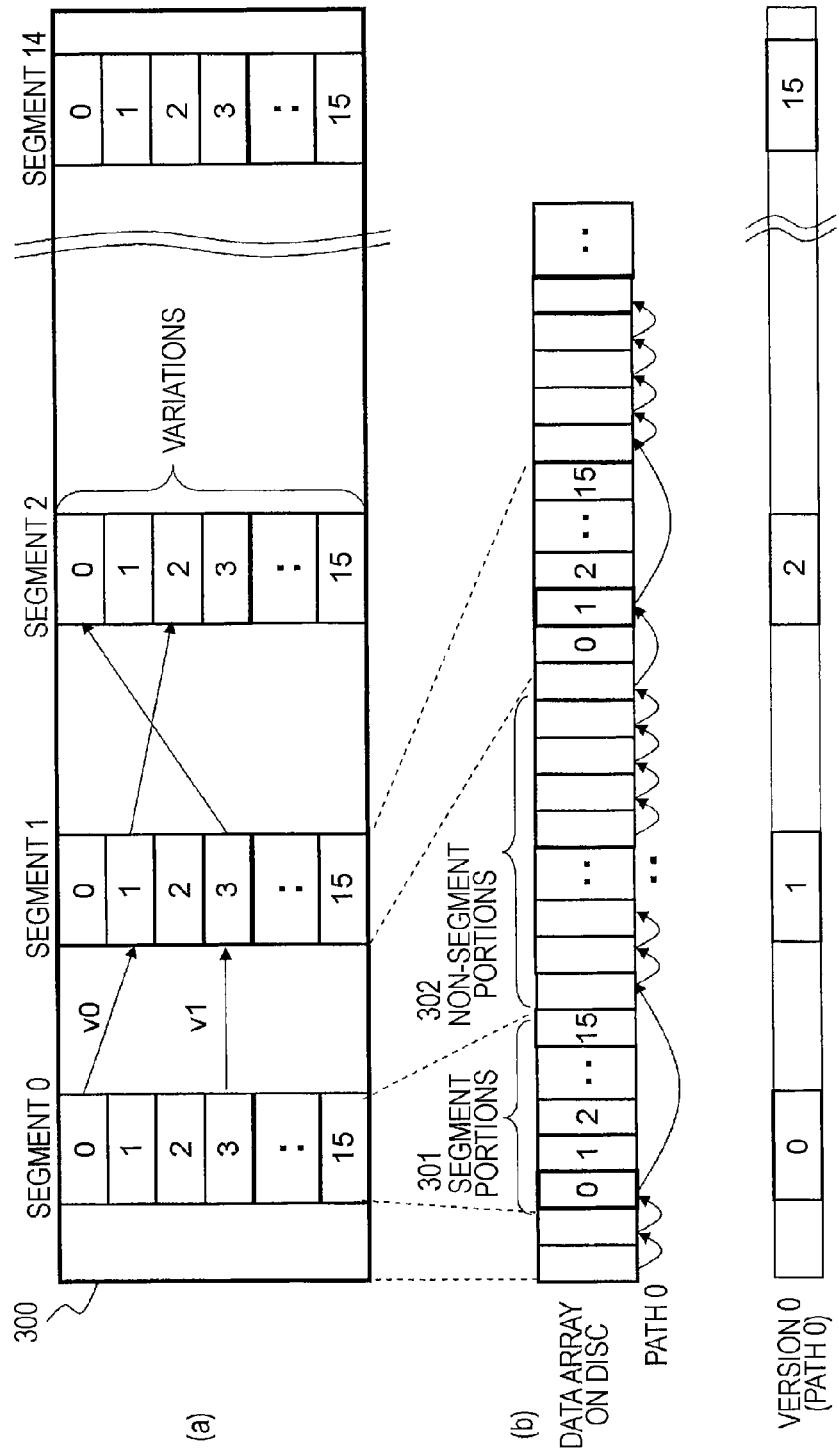
FIG. 4 illustrates the configuration of segments to be set for content.

The data array structure of content stored in an information recording medium is described below with reference to FIG. 4. FIG. 4(a) illustrates a segment configuration similar to that shown in FIG. 3(a). The actual data array on a disc, which serves as an information recording medium, is the array shown in FIG. 4(b). That is, the segment portions 301 and the non-segment portions 302 are alternately disposed. In each segment portion, the segment data corresponding to the different variation numbers 0 to 15 are disposed.

The arrows in FIG. 4(b) indicate the playback path (path 0) of the information processing apparatus that has obtained version 0(v0) as the version corresponding to the playback content. The non-segment portions 302 are the data common to all the versions and can be played back by being decrypted with the above-described CPS unit key. The segment portion 301 is the data of the same scene encrypted with different cryptographic keys 0 to 15, and from those data, one variation data determined based on the version is selected and decrypted.

Variation identification information is recorded by, for example, digital watermark, on each segment data associated with a variation number set in each segment. If there are 16 variations from 0 to 15 in each segment, as shown in FIGS. 3 and 4, identification information for identifying to which variation each segment data belongs is embedded in the segment data. For example, numerical value data associated with the variation numbers 0 to 15 are embedded as digital watermark. With this arrangement, if an unauthorized copy disc is distributed later, it is possible to analyze the path of the unauthorized copy data to specify the copy source.

On the basis of the unit classification number associated with a CPS unit to be played back and data set in a unit classification key file stored in the information processing apparatus, the information processing apparatus obtains the version number associated with the unit to obtain a playlist determined by the obtained version number, thereby performing a playback operation based on the playlist. By performing a playback operation based on the selected playlist, the playback operation according to the specific playback path can be performed.

The path to be set in each playlist contained in the CPS unit can be set as desired by a content production or editing side, and desired paths can be assigned to the information processing apparatuses having version 0 to 255 in accordance with content belonging to the content management units.

(2.3. CPS Unit Key File)

As discussed with reference to FIG. 2, a unit classification number is assigned to a content management unit (CPS unit) stored in an information recording medium. Setting information concerning unit classification numbers assigned to a plurality of content management units (CPS units) stored in the information recording medium is stored in the CPS unit key file 115 shown in FIG. 1.

Figure 6:
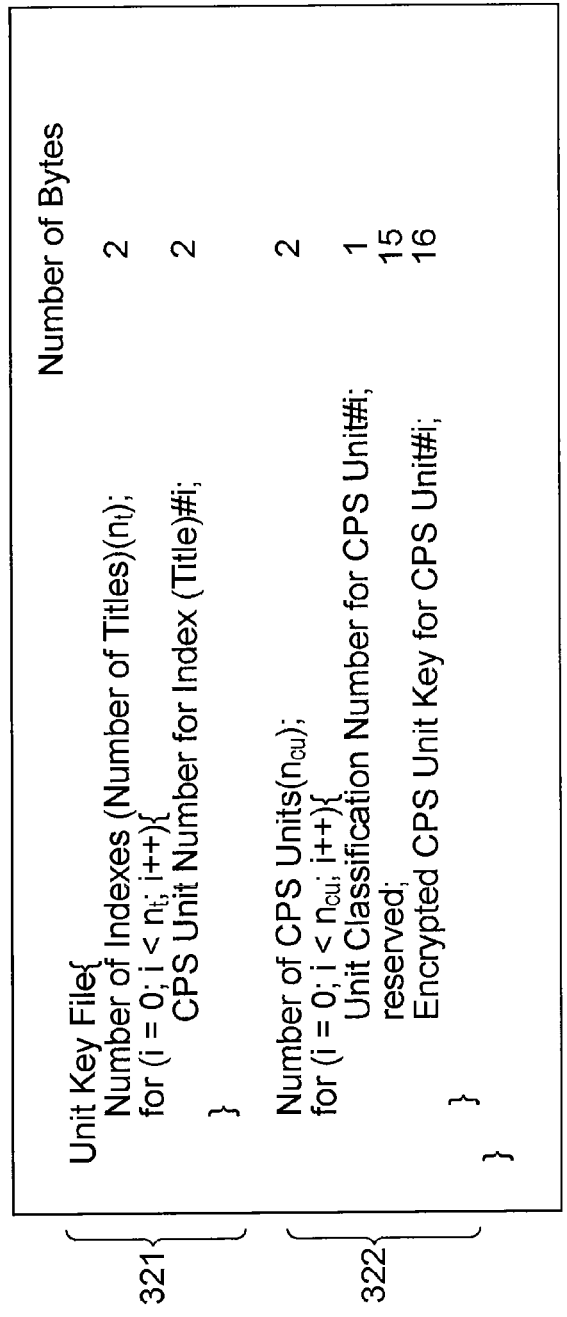
FIG. 6 is a syntax diagram illustrating the configuration of a CPS unit key file.

The specific configuration of the CPS unit key file is discussed below with reference to FIGS. 5 and 6. FIG. 5 illustrates the configuration of the CPS unit key file as a table, and FIG. 6 is a syntax diagram illustrating the data structure of the actual file. The CPS unit key file is divided into, as shown in FIG. 5, index information, such as titles, which are associated with content management unit numbers (CPS unit numbers), unit classification numbers (Movie Sequence Numbers), and encrypted CPS unit keys [Kun].

The unit classification numbers (Movie Sequence Numbers) are associated with, for example, numbers 0 to 254, and one of the 255 unit classification numbers 0 to 254 is set in each content management unit (CPS unit). The settings of unit classification numbers are performed by a content production or editing side.

The CPS unit key file shown in FIG. 5 corresponds to the configuration shown in FIG. 2. For example, title 1 and title 2 belong to the same CPS unit (CPS1), and the unit classification number 14 is set in the CPS unit (CPS1). Application 1 belongs to the CPS unit (CPS2), and the unit classification number 35 is set in the CPS unit (CPS2).

On the basis of the unit classification number set in each CPS unit and data stored in the unit classification key file stored in an information processing apparatus to play back content, the information processing apparatus obtains the version number associated with the CPS unit and plays back the content based on the playlist (in which path information has been set) determined by the version. That is, the information processing apparatus selects and decrypts one segment data in each segment portion of the content discussed with reference to FIG. 3.

FIG. 6 is a syntax diagram illustrating the data structure of the CPS unit key file shown in FIG. 5. A data portion 321 is a recording area in which definition information concerning the CPS unit number associated with each index is recorded. A data portion 322 is a recording area in which definition information concerning the unit classification number for each CPS unit and a cryptographic CPS unit key for each CPS unit are recorded.

As stated above, the unit classification number (Movie Sequence Number) is set for each CPS unit. Alternatively, the unit classification number (Movie Sequence Number) may be set for each index, such as a title, or a plurality of unit classification numbers (Movie Sequence Numbers) may be set for each CPS unit. Examples of setting unit classification numbers are described in Section [3. Setting of Unit Classification Numbers].

(2.4. Segment Key File)

The detailed configuration of the segment key file 116 (see FIG. 1) stored in the information recording medium 100 is discussed below with reference to FIGS. 7, 8, and 9. The segment key file is set for each content management unit (CPS unit) stored in the information recording medium. That is, if there are n CPS units stored in the information recording medium, n segment key files are set and recorded in the information recording medium.

FIG. 7 illustrates the configuration of the segment key file as a table, and FIG. 8 is a syntax diagram illustrating the data structure of the actual segment key file. The segment key file is configured, as shown in FIG. 7, such that unit versions are associated with encrypted data of segment keys for segments 0 to 14.

In the unit version V(n, i), n represents the path number 0 to 255, and i designates the unit classification number. The path number is the path identification number which is set by selecting one segment data in each segment portion described with reference to FIGS. 3 and 4. As stated above, the path is determined based on the version number associated with a CPS unit, the version number being determined based on the unit classification number set in the CPS unit and the data stored in the unit classification key file: Kc(n, i) stored in the memory of an information processing apparatus. That is, one path is determined based on one version number. Although a description is given below, assuming that the version number is equal to the path number, this is only for the sake of convenience, it is not essential that the version number and the path number coincide with each other.

In the unit version V(n, i), i designates the unit classification number. Since title 1 shown in FIGS. 2 and 5 corresponds to CPS unit 1, and since the classification number of the CPS unit 1 is 14, the unit versions (0, 4) through (255, 14) are set for the content associated with title 1 of the CPS unit 1.

An information processing apparatus to play back the content selects one of the 256 unit versions (0, 14) through (255, 14) and obtains the encrypted segment-key generating key Ks'(x, y) in the entry of each of the segments 0 to 14 associated with the selected row of the table. The information processing apparatus then decrypts the encrypted segment-key generating key Ks'(x, y) to obtain the segment-key generating key Ks'(x, y), and further obtains the segment key Ks(x, y) based on the segment-key generating key Ks'(x, y) to decrypt one segment data corresponding to one of variation numbers 0 to 15 set in each of segments 0 to 14. The specific processing thereof is described below.

In the segment key file shown in FIG. 7, encrypted segment-key generating keys, i.e., [Enc(Ke'(n, i), Ks'(x, y)], are stored in segments 0 to 14. Enc(a, b) indicates that b is encrypted with a. In Ke'(n, i), as in n and i in the unit version V(n, i), n is the path number 0 to 255, and i is the unit classification number. In Ks'(x, y), x is the segment number (0 to 14), and y is the variation number (0 to 15). The segment number and the variation number have been discussed with reference to FIG. 3. The key Ke'(n, i) is a key that can be generated based on the data stored in the information processing apparatus and the data stored in the information recording medium. The generation of this key is described in the following section.

An information processing apparatus to play back the content selects one of the 256 unit versions (0, i) through (255, i) and obtains the encrypted segment-key generating key Ks'(x, y) in the entry of each of the segments 0 to 14 associated with the selected row of the table, thereby playing back the content.

The unit version to be selected is determined based on the unit classification number set for the CPS unit associated with content to be played back and the data stored in the unit classification key file stored in the memory of the information processing apparatus. For example, according to the version number determined based on the unit classification number and the data stored in the unit classification key file, the playlist in which one path is set is selected. The selected playlist is formed of play items in accordance with one of the paths in the 256 unit versions (0, i) through (255, i). By performing a playback operation according to the playlist, the content can be played back in accordance with one of the paths in the 256 unit versions (0, i) through (255, i) shown in FIG. 7.

For example, the information processing apparatus that selects the version (0, i) at the topmost section in FIG. 7 as the playback path can obtain the encrypted segment-key generating key Ks'(0, 3) in segment 0 to select and decrypt the segment data having segment number 0 and variation number 3, and can obtain the encrypted segment-key generating key Ks'(1, 2) in segment 1 to select and decrypt the segment data having segment number 1 and variation number 2. In this manner, the 256 unit versions (0, 14) through (255, 14) are associated with different paths, and the information processing apparatus plays back the content by selecting segment data in accordance with the single path selected from the 256 paths.

Figure 12:
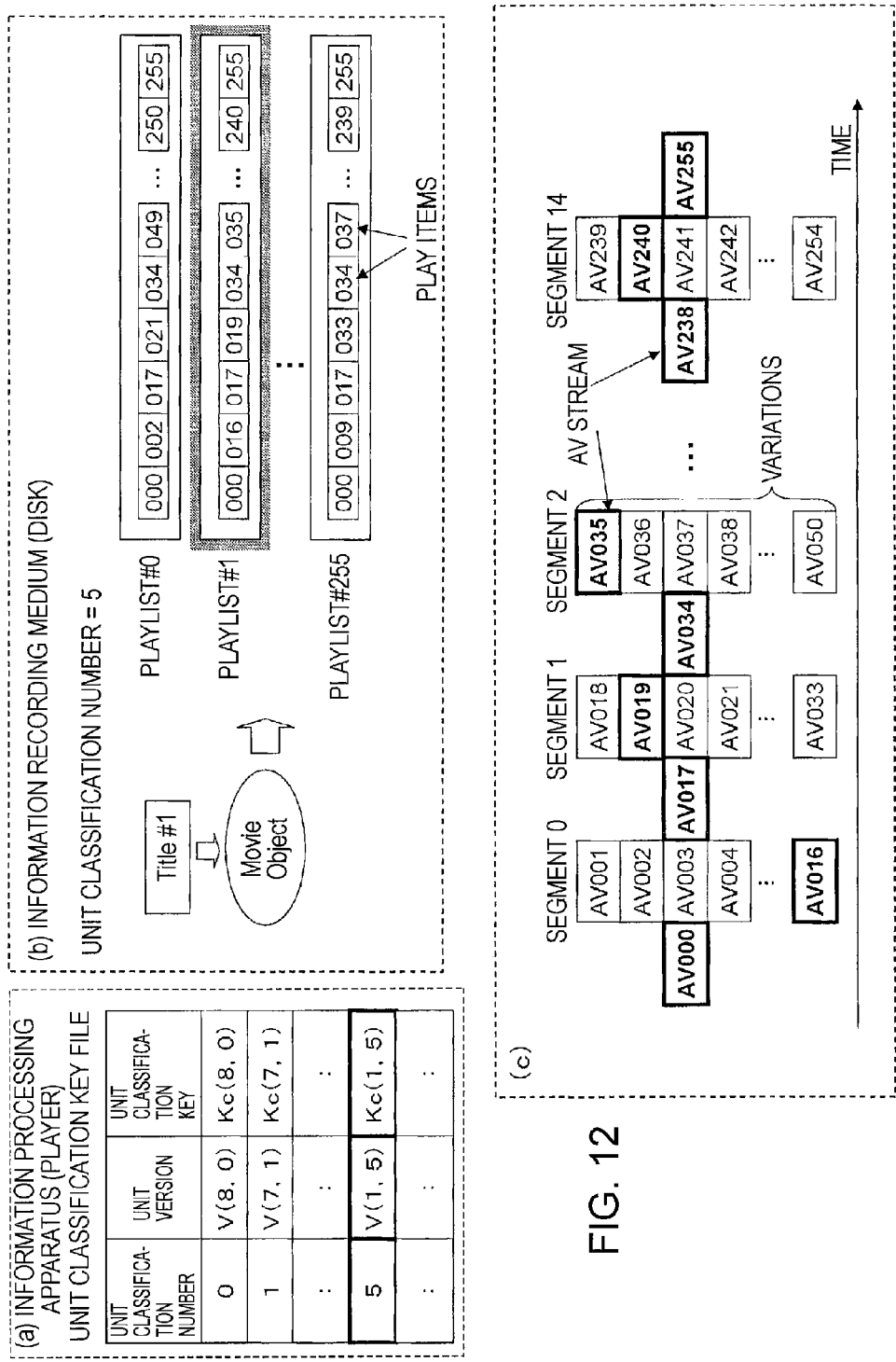
FIG. 12 illustrates selection of a playlist on the basis of a movie object, which is a content playback program, and playback processing on the basis of play items.

The actual path setting information is recorded in a playlist discussed with reference to FIG. 2. That is, the playlists associated with the 256 paths are set, and by performing a playback operation according to the playlist selected by the unit version, the information processing apparatus selects one of the paths corresponding to the unit version in the table shown in FIG. 7 and then plays back the content. The configuration in which the paths are set based the playlists and play items is discussed in the following section with reference to the drawing (FIG. 12).

FIG. 8 is a syntax diagram illustrating the data structure associated with the segment key file shown in FIG. 7. A data portion 331 is a recording area in which a CPS unit number that plays back content by using a sequence key, which is a combination of a specific segment key and a CPS unit key, is recorded. A data portion 332 is a recording area in which definition information corresponding to the table shown in FIG. 7, i.e., playlists associated with the 256 unit versions, play items in the playlists, and encrypted segment-key generating keys Ks'(x, y) in each segment are recorded. In the table shown in FIG. 7, only the encrypted segment-key generating keys Ks'(x, y) in each segment are shown. As shown in FIG. 9, however, in the segment key file, playlist IDs and play item IDs in each segment are recorded.

When playing back content, the information processing apparatus selects a playlist and a play item specified by a movie object as a playback program described with reference to FIG. 11 in the subsequent section.

The playlist is sequence data including play items, which are playback units according to a playback path, and is set as a play item string in which segment portions and non-segment portions discussed with reference to FIG. 3 are arranged according to the playback path. A playlist ID and a play item ID are set as identifiers for each playlist and each play item, respectively, and when playing back content, the information processing apparatus refers to the segment key file to determine whether the playlist and the play item have the same playlist ID and play item ID as those set in the segment key file. If the two IDs coincide with each other, the information processing apparatus determines that the corresponding segment data is to be played back, and generates the segment keys, thereby decrypting the data of one of variations 0 to 15 in each segment according to the play items in the playlist.

(2.5. Unit Classification Key File)

A description is now given, with reference to FIG. 10, of the unit classification key file stored in the memory of an information processing apparatus to play back content. FIG. 10 illustrates the configuration of the unit classification key file stored in the memory of the information processing apparatus 150 as a table. As discussed with reference to FIG. 1, the information processing apparatus 150 stores the unit classification key file: Kc(n, i) in the memory 154.

The unit classification key file is configured, as shown in FIG. 10, such that the unit classification number is associated with the unit version V(n, i) and the unit classification key (n, i). As in the unit version V(n, i) of the segment key file discussed with reference to FIG. 7, in the unit version V(n, i) and the unit classification key (n, i), n represents the path number 0 to 255, and i designates the unit classification number.

The information processing apparatus to play back content has 255 unit classification keys corresponding to the unit classification numbers 0 to 254 shown in FIG. 10.

As stated above, the unit classification number is the number set for each content management unit (CPS unit). The information processing apparatus to play back content selects the unit classification key based on the unit classification number of content to be played back. For example, when playing back content corresponding to the CPS unit having unit classification number 0, the information processing apparatus storing the table shown in FIG. 10 selects the unit classification key: Kc(35, 0). The specific processing performed in playing back content is discussed below.

(2.6. Movie Object)

The configuration of a movie object as a content playback program contained in a content management unit recorded on an information recording medium is discussed below with reference to FIG. 11. The movie object is a content playback program set in the hierarchical level of the (B) movie object in the CPS hierarchical diagram shown in FIG. 2, and stores a command set recorded by using dedicated commands or commands, such as Java™.

Figure 11:
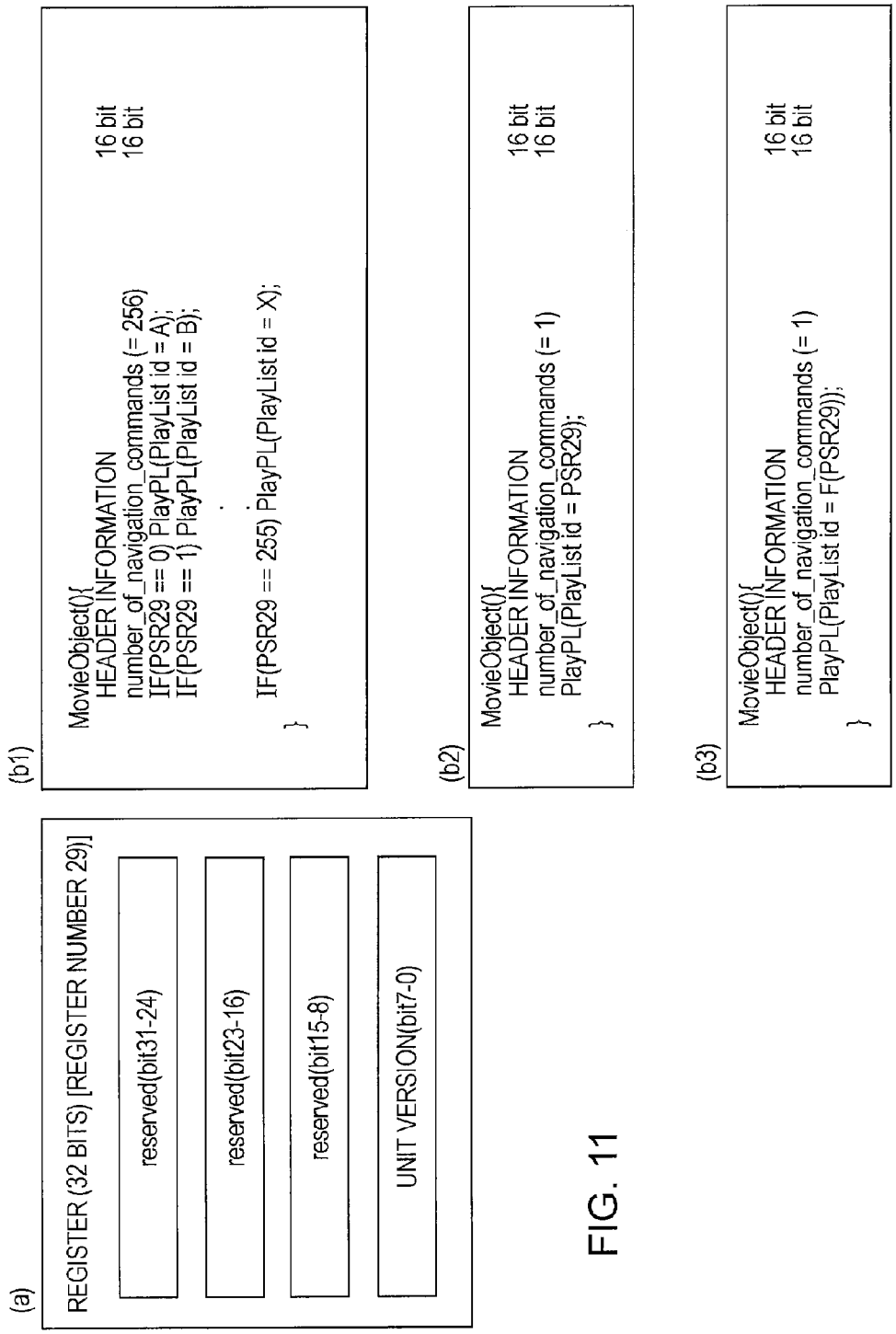
FIG. 11 illustrates the configuration of a movie object, which is a content playback program.

In FIG. 11, the register configuration of an information processing apparatus is shown in (a). Three examples of movie objects are shown in (b1), (b2), and (b3). The movie object selects one of the playlists 0 through 255 according to the register set value (0 through 255) of the information processing apparatus.

When playing back content, the information processing apparatus sets, in the register, the value deduced from the unit classification number set in the CPS unit associated with the content to be played back and the unit classification key data stored in the information processing apparatus. The value set in the register is the version number. Based on the version number, a playlist in which one path is set is selected.

The register and set values are defined, for example, as follows.

Register number=PSR29

Name=unit version

Value range=0 through 255

Definition=information used for selecting the playback path in sequence key (SequenceKey) content Operation=when installing an information recording medium or changing the CPS unit, the value deduced from the unit classification number set in the CPS unit and the unit classification key data stored in the information processing apparatus is set in the register. PSR29 represents the player status register, which is a register for storing the status of the device and setting information.

In the movie object shown in FIG. 11(b1), when the set value of the register [PSR29] is 0, playlist A is selected and the content is played back. When the set value of the register PSR29 is 1, playlist B is selected and the content is played back. When the set value of the register [PSR 29] is 255, playlist X is selected and the content is played back. Each playlist has play items associated with one of the paths in the 256 unit versions (0, i) through (255, i) shown in FIG. 7.

The movie object shown in FIG. 11(b1) has a program configuration in which the playlist associated with each register set value is indicated. The movie object shown in FIG. 11(b2) has a program configuration in which the register set value itself is set as the playlist ID. In this example, when the set value of the register [PSR 29] is 0, playlist 0 is selected and the content is played back. When the set value of the register [PSR29] is 1, playlist 1 is selected and the content is played back.

In the movie object shown in FIG. 11(b3), computation processing (F) is executed on each register set value, and the resulting value is set as the playlist ID. The computation processing executed in this example is to add a predetermined value (256) to the register set value as expressed by:

Playlist_id=256+[PSR29].

Then, selecting a playlist and setting a playback path based on a movie object is described below with reference to FIG. 12. FIG. 12(a) illustrates the unit classification key file stored in the information processing apparatus. FIG. 12(b) illustrates the configuration of content corresponding to one CPS unit stored in the information recording medium. In the CPS unit content, unit classification number 5 is set, and a movie object as a playback program is specified based on title #1, and a playlist is selected based on the movie object. This configuration corresponds to the CPS unit configuration discussed with reference to FIG. 2.

The playlists shown in FIG. 12(b) include 255 playlists corresponding to the playback paths, and have different play item sequences. That is, play items are selected such that one segment data is selected in each of segments 0 to 14. In FIG. 12(b), for easy understanding, one segment corresponds to one play item. The data amount of a play item may be equal to or different from the data amount of a segment.

The movie object selects one playlist, as discussed with reference to FIG. 11, based on the version number determined by the unit classification number and the data stored in the unit classification key file stored in the memory of the information processing apparatus. In the example shown in FIG. 12, the unit classification number is 5.

In the unit classification key file stored in the memory of the information processing apparatus, the entry in which the unit classification number is 5 is extracted, and the unit version associated with this entry is obtained. In the unit version, V(1, 5) is set. In V(1, 5), 1 is the path number and 5 is the unit classification number. In this case, it is assumed that [1] corresponding to the path number is the version number obtained in the movie object. The version number may be calculated by using the path number and the unit classification number.

The movie object specifies the playlist associated with each version number, as discussed with reference to FIG. 11, and in this example, playlist 1 is specified for version number 1.

The playlist includes, as shown in FIG. 12(b), sequence information concerning a plurality of play items. Playlist 1 has play item information, such as [000], [016], [017], [019], . . . , and [255]. Content is played back by sequentially selecting those play items.

FIG. 12(c) illustrates the configuration of playback processing by play item 1 in association with segment portions and non-segment portions. The play items specified by play item 1 are, as shown in FIG. 12(c), a sequence of a non-segment portion [AV000], a segment portion [AV016], and a non-segment portion [AV017], and one path is set by the playlist. It should be noted that [AVxxx] is AV stream data corresponding to play item [xxx].

In each segment portion, one segment data is selected from segment data including a plurality of variations. In performing playback processing, the segment portions are decrypted with the segment keys and the non-segment portions are decrypted with the unit key.

Figure 13:
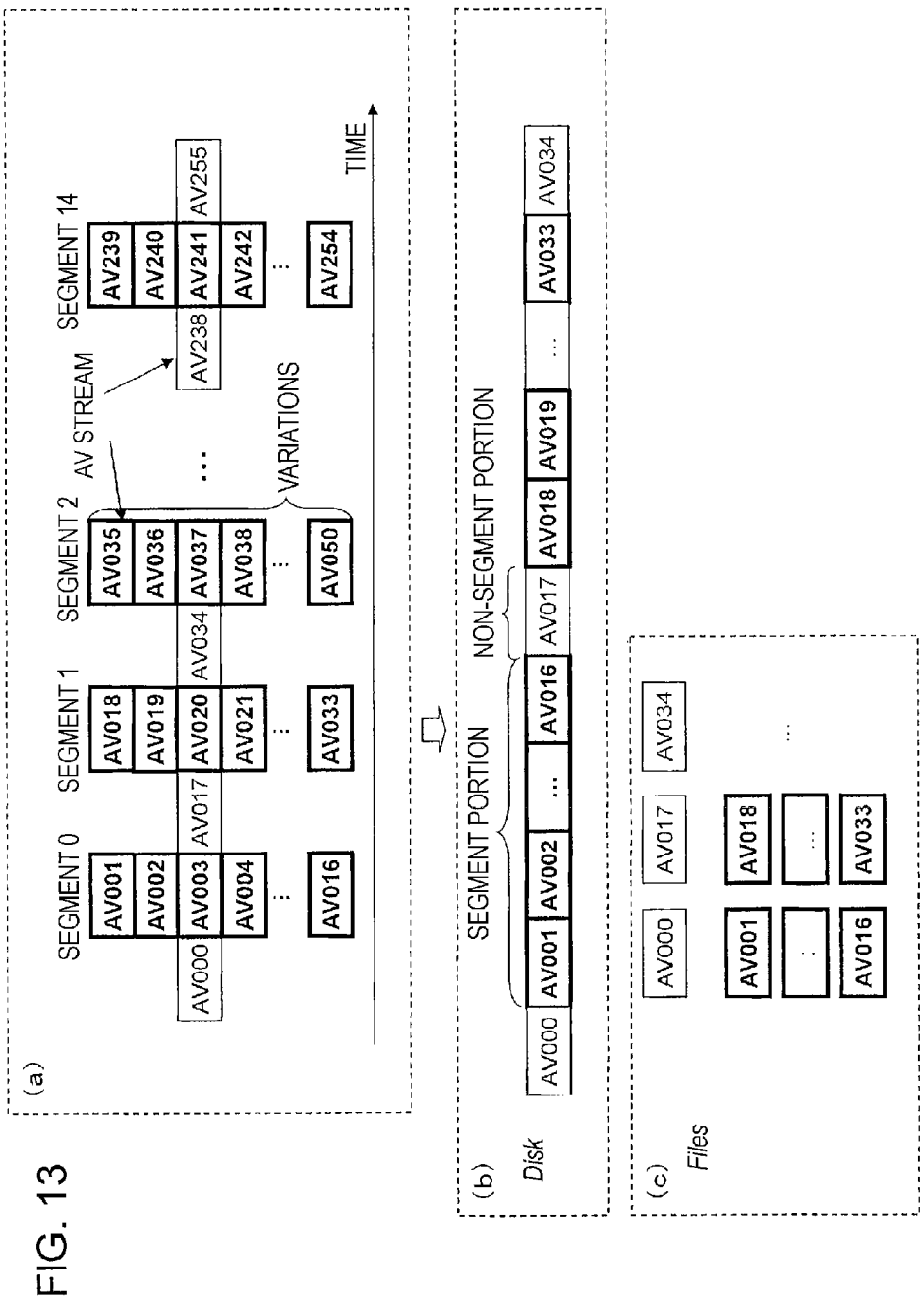
FIG. 13 illustrates the structure of content stored in an information processing apparatus and the setting of AV stream data files.

The AV stream data corresponding to the play items are recorded on the information recording medium, as indicated in FIG. 13(b), such that AV stream data of non-segment portions and AV stream data of segment portions having a plurality of variations are sequentially recorded, as discussed with reference to FIG. 4. The AV stream files of the segment portions and the non-segment portions are set as independent encrypted files, as indicated in FIG. 13(c), and the header and the end portion of each file are recorded so that the seamless playback operation can be ensured at the connecting portions of the files.

[3. Setting of Unit Classification Numbers]

As stated above, the unit classification number (Movie Sequence Number) may be set for each CPS unit. Alternatively, the unit classification number (Movie Sequence Number) may be set for each index, such as a title, or a plurality of unit classification numbers (Movie Sequence Numbers) may be set for each CPS unit. Information concerning the settings of the unit classification numbers (Movie Sequence Numbers) is stored in the CPS unit key file 115 shown in FIG. 1. The structure of the CPS unit key file when the unit classification number (Movie Sequence Number) is set for each CPS unit has been discussed with reference to FIGS. 5 and 6.

A description is now given of the structures of CPS unit key files when the unit classification number is set for each CPS unit, and when the unit classification number is set for each index, such as a title, and when a plurality of unit classification numbers are set for each CPS unit.

(3.1. Setting of Unit Classification Number for Each CPS Unit)

A CPS unit key file in which a plurality of unit classification numbers (Movie Sequence Numbers) are set for each CPS unit is discussed below with reference to FIGS. 14 and 15. FIG. 14 illustrates the structure of the CPS unit key file stored in an information recording medium as a table, and FIG. 15 is a syntax diagram illustrating the data structure of the file. The settings of the structure of the file shown in FIGS. 14 and 15 are basically similar to those shown in FIGS. 5 and 6. The CPS unit key file is divided into, as shown in FIG. 14, index information, such as titles, which are associated with content management unit numbers (CPS unit numbers), unit classification numbers (Movie Sequence Numbers), and encrypted CPS unit keys [Kun].

The indexes include titles, which serve as application index files, containing content titles to be displayed on a display unit of a content playback device, applications, such as game content, and WEB content, first playback (First Playback) information, which serves, as playback content index information to be started when an information recording medium (disc) is installed in a drive, and a top menu (Top Menu), which serves as index information concerning content to be played back, displayed when a menu display function is started.

In this example, a unit classification number (Movie Sequence Number) is assigned to each CPS unit. That is, the same unit classification number (Movie Sequence Number) is assigned to different indexes if the indexes have the same CPS unit number.

If it is desired, for example, that two or more different content items are recorded on one disc and different unit classification numbers (Movie Sequence Numbers) are assigned to the content items, the content is divided into CPS units according to the content items. Then, different unit classification numbers (Movie Sequence Numbers) can be assigned to the content items. Numbers, such as 0 to 254, are set for the unit classification numbers, and one of the unit classification numbers (Movie Sequence Numbers) is assigned to each CPS unit. The setting of the unit classification numbers is performed by a content production/editing entity.

To play back content, based on the unit classification number set for each CPS unit and the data stored in the unit classification key file stored in an information processing apparatus, the information processing apparatus obtains the version number associated with the corresponding CPS unit, and plays back the content in accordance with the playlist (including path information) determined based on the version.

FIG. 15 is a syntax diagram illustrating the data structure of the CPS unit key file shown in FIG. 14. A data portion 341 is a definition area for CPS unit numbers set for indexes, such as first playback information, top menu, and title. In this example, the [titles] also include applications and data groups. A data portion 342 is a definition area for unit classification numbers (Movie Sequence Numbers) set for the CPS units. A data portion 343 is an area in which CPS unit keys for the CPS units are recorded.

(3.2. Setting of Unit Classification Number for Each Index, Such as Title)

A description is now given, with reference to FIGS. 16 and 17, of a CPS unit key file in which a unit classification number (Movie Sequence Numbers) is assigned to each index, such as a title, rather than to each CPS unit. FIG. 16 illustrates the structure of the CPS unit key file as a table, and FIG. 17 is a syntax diagram illustrating the data structure of the file. The CPS unit key file is divided into, as shown in FIG. 16, index information, such as titles, which are associated with content management unit numbers (CPS unit numbers), unit classification numbers (Movie Sequence Numbers), and encrypted CPS unit keys [Kun].

The indexes include titles, which serve as application index files, containing content titles to be displayed on a display unit of a content playback device, applications, such as game content and WEB content, first playback (First Playback) information, which serves as playback content index information to be started when an information recording medium (disc) is installed in a drive, and a top menu (Top Menu), which serves as index information concerning content to be played back, displayed when a menu display function is started.

In this example, a unit classification number (Movie Sequence Number) is assigned to each index, such as a title. That is, different unit classification numbers (Movie Sequence Numbers) are assigned to corresponding indexes even if the indexes have the same CPS unit number.

If it is desired, for example, that two or more different content items are recorded on one disc and different unit classification numbers (Movie Sequence Numbers) are assigned to the content items, a unit classification number can be assigned to each index, such as a title, regardless of the framework of the CPS units. Numbers, such as 0 to 254, are set for the unit classification numbers (Movie Sequence Numbers), and one of the unit classification numbers is assigned to each title without being restricted by a manner of dividing the content management units (CPS units). The setting of the unit classification numbers is performed by a content production/editing entity.

To play back content, based on the unit classification number set for each index and the data stored in the unit classification key file stored in an information processing apparatus, the information processing apparatus obtains the version number associated with the corresponding CPS unit, and plays back the content in accordance with the playlist (including path information) determined based on the version.

FIG. 17 is a syntax diagram illustrating the data structure of the CPS unit key file shown in FIG. 16. A data portion 351 is a definition area for CPS unit numbers and unit classification numbers (Movie Sequence Numbers) set for indexes, such as first playback information and top menu. A data portion 352 is a definition area for CPS unit numbers and unit classification numbers set for the titles. In this example, the [titles] also include applications and data groups. A data portion 353 is an area in which CPS unit keys for the CPS units are recorded.

(3.3. Setting of Plural of Unit Classification Numbers for Each CPS Unit)

A description is now given, with reference to FIGS. 18 and 19, of a CPS unit key file in which a plurality of unit classification numbers (Movie Sequence Numbers) are assigned to each CPS unit. FIG. 18 illustrates the structure of the CPS unit key file as a table, and FIG. 19 is a syntax diagram illustrating the data structure of the file. The CPS unit key file is divided into, as shown in FIG. 18, index information, such as titles, which are associated with content management unit numbers (CPS unit numbers), unit classification numbers (movie sequence numbers), and encrypted CPS unit keys [Kun].

The indexes include titles, which serve as application index files, containing content titles to be displayed on a display unit of a content playback device, applications, such as game content and WEB content, first playback (First Playback) information, which serves as playback content index information to be started when an information recording medium (disc) is installed in a drive, and a top menu (Top Menu), which serves as index information concerning content to be played back, displayed when a menu display function is started.

In this example, a plurality of unit classification numbers (Movie Sequence Numbers) can be assigned to the same CPS unit. In this case, each unit classification number includes the corresponding CPS unit number. That is, in the unit classification number X(i, j) shown in FIG. 18, i represents the content management unit (CPS unit) number, and j designates the sequence number of the unit classification number set in the same CPS unit.

In this example, the unit classification number includes the CPS unit number, and a plurality of unit classification numbers (Movie Sequence Numbers) can be assigned to the same CPS unit while maintaining the framework of the CPS unit. This makes it possible to assign different unit classification numbers (Movie Sequence Numbers) to, for example, corresponding indexes, such as titles, in the CPS unit. Numbers, such as 0 to 254, are set for the unit classification numbers (Movie Sequence Numbers), and one of the unit classification numbers is assigned to each data of the same CPS unit without being restricted by a manner of dividing the content management units (CPS units). The setting of the unit classification numbers is performed by a content production/editing entity.

To play back content, based on the unit classification number and the data stored in the unit classification key file stored in an information processing apparatus, the information processing apparatus obtains the version number associated with the corresponding CPS unit, and plays back the content in accordance with the playlist (including path information) determined based on the version.

FIG. 19 is a syntax diagram illustrating the data structure of the CPS unit key file shown in FIG. 18. A data portion 361 is a definition area for CPS unit numbers set for indexes, such as first playback information, top menu, and title. A data portion 362 is a definition area for the number of unit classification numbers (Movie Sequence Numbers) for each CPS unit and for the unit classification numbers (Movie Sequence Numbers). In this example, the [titles] also include applications and data groups. A data portion 363 is an area in which CPS unit keys for the CPS units are recorded.

A description is given below, with reference to FIG. 20, of an information processing apparatus or an information recording medium manufacturing apparatus that encrypts content and records the encrypted content on an information recording medium.

FIG. 20 is a block diagram illustrating the functional configuration of an apparatus that encrypts content and generates recording data. The apparatus includes, as shown in FIG. 20, encrypt processing means 381 for encrypting content, cryptographic key file generating means 382 for generating a cryptographic key file containing cryptographic key information used for encrypting content, and recording means 383 for recording the encrypted content generated by the encrypt processing means 381 and the cryptographic key file generated by the cryptographic key file generating means 382 on an information recording medium 390.

The encrypt processing means 381 encrypts segment portions forming content by using different segment keys to generate encrypted data having different variations, and encrypts non-segment portions by using the unit key set for content management units, which serve as a base unit for using the content. In this case, when encrypting the content, the encrypt processing means 381 changes a combination of segment keys used for encrypting the segment portions in accordance with the unit classification numbers set for the content.

The cryptographic key file generating means 382 generates cryptographic key files, and more specifically, a segment key file and a unit key file including information concerning the generation of the unit key associated with the content management units and unit classification numbers, which serve as identification information concerning a combination of segment keys for encrypting the segment portions.

The cryptographic key file generating means 382 generates, as discussed with reference to FIGS. 14 through 19, one of the following unit key files:

(a1) a cryptographic key file in which a unit classification number is associated with each content management unit;

(a2) a cryptographic key file in which a unit classification number is associated with each index contained in a content management unit; and (a3) a cryptographic key file in which a plurality of unit classification numbers are associated with each content management unit.

The encrypt processing means 381 performs one of the following encryption operations in accordance with the unit key file generated by the cryptographic key file generating means 382:

(b1) encrypting content by changing a combination of segment keys used for encrypting the segment portions in accordance with the unit classification number set for each content management unit;

(b2) encrypting content by changing a combination of segment keys used for encrypting the segment portions in accordance with the unit classification number set for each index; and (b3) encrypting content by changing a combination of segment keys used for encrypting the segment portions in accordance with each of the unit classification numbers set for each content management unit.

As a result, the information recording medium 390 stores the encrypted content and the cryptographic key files including cryptographic key information used for encrypting the content.

The encrypted content to be recorded includes segment portions having different variations generated by being encrypted with a plurality of segment keys, and non-segment portions encrypted with the unit key set for content management units, which serve as the base unit for using the content. A combination of segment keys used for encrypting the segment portions is changed according to the unit classification numbers set for the content.

The unit key file is recorded as a cryptographic key file including information concerning the generation of the unit key associated with content management units and also including unit classification numbers, which serve as identification information concerning a combination of segment keys used for encrypting segment portions.

The unit key file stored in the information recording medium is one of the above-described unit key files (a1), (a2), and (a3), and the encrypted content is generated by one of the above-described encryption operations (b1), (b2), and (b3).

[4. Content Playback Processing in Information Processing Apparatus]

Figure 21:
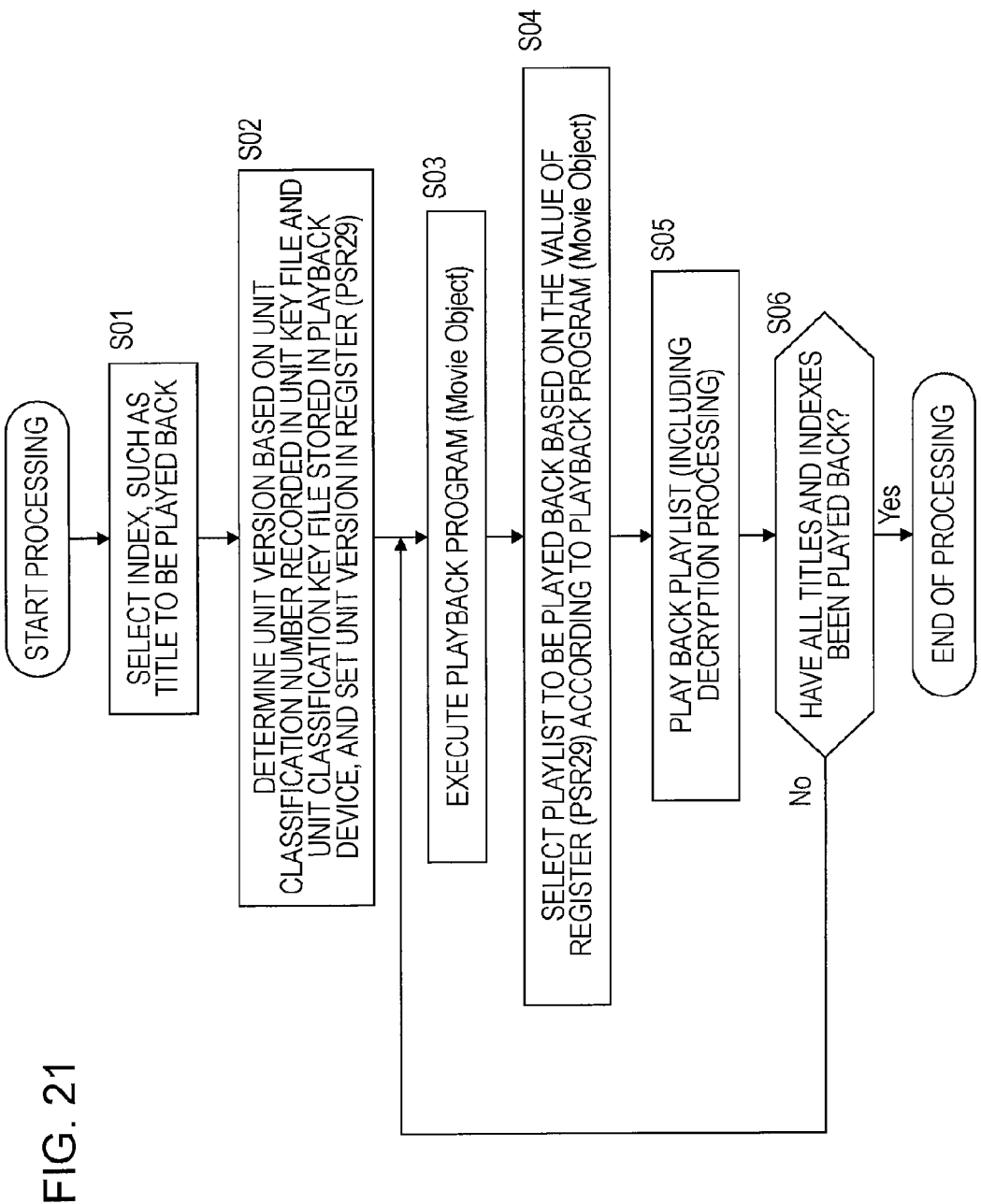
FIG. 21 illustrates a content playback processing sequence in an information processing apparatus.

A content playback processing sequence in an information processing apparatus is described below with reference to FIG. 21 and the subsequent figures. Reference is first given of FIG. 21 to discuss an overview of content playback processing in an information processing apparatus.

To play back content stored in an information recording medium, in step S01, the information processing apparatus selects an index, such as a title, to be played back. Then, in step S02, the information processing apparatus obtains the unit classification number set for the specified index from the CPS unit key file, and determines the version number (unit version) based on the unit classification number and the data stored in the unit classification key file stored in the information processing apparatus, and then sets the determined version in the register (PSR29). This processing corresponds to processing for setting the version in the player status register 29 discussed with reference to FIG. 11.

Then, in step S03, the information processing apparatus executes the movie object selected as the playback program based on the specified index, such as the title. The movie object contains, as discussed with reference to FIG. 11, a program for selecting the playlist based on the version set in the register in step S02. By executing the movie object in step S03, the playlist to be played back is selected in step S04.

The playlist contains, as discussed with reference to FIG. 12, play items to be played back in accordance with a specific path. Then, in step S05, the content is played back in accordance with the selected playlist. To play back the content, the encrypted content is decrypted. More specifically, segment portions are decrypted by using the corresponding segment keys, while non-segment portions are decrypted by using the unit key. Details of this processing are discussed below with reference to FIGS. 22 and 23.

After step S05, it is determined in step S06 whether all titles have been processed. If not, the process returns to step S03, and step S03 and the subsequent steps are repeated. If it is determined in step S06 that all titles have been processed, the processing is completed.

A content playback processing sequence in an information processing apparatus is described below with reference to FIGS. 22 and 23. Content stored in an information recording medium has segment portions and non-segment portions, as discussed with reference to FIGS. 3 and 4. The non-segment portions are handled by common processing, i.e., the non-segment portions are played back by the obtained unit key (Ku) regardless of the version of the information processing apparatus. On the other hand, for playing back the segment portions, the path for selecting different segment data according to the version of the information processing apparatus is determined, and the segment data is selected and decrypted in accordance with the path.

Figure 22:
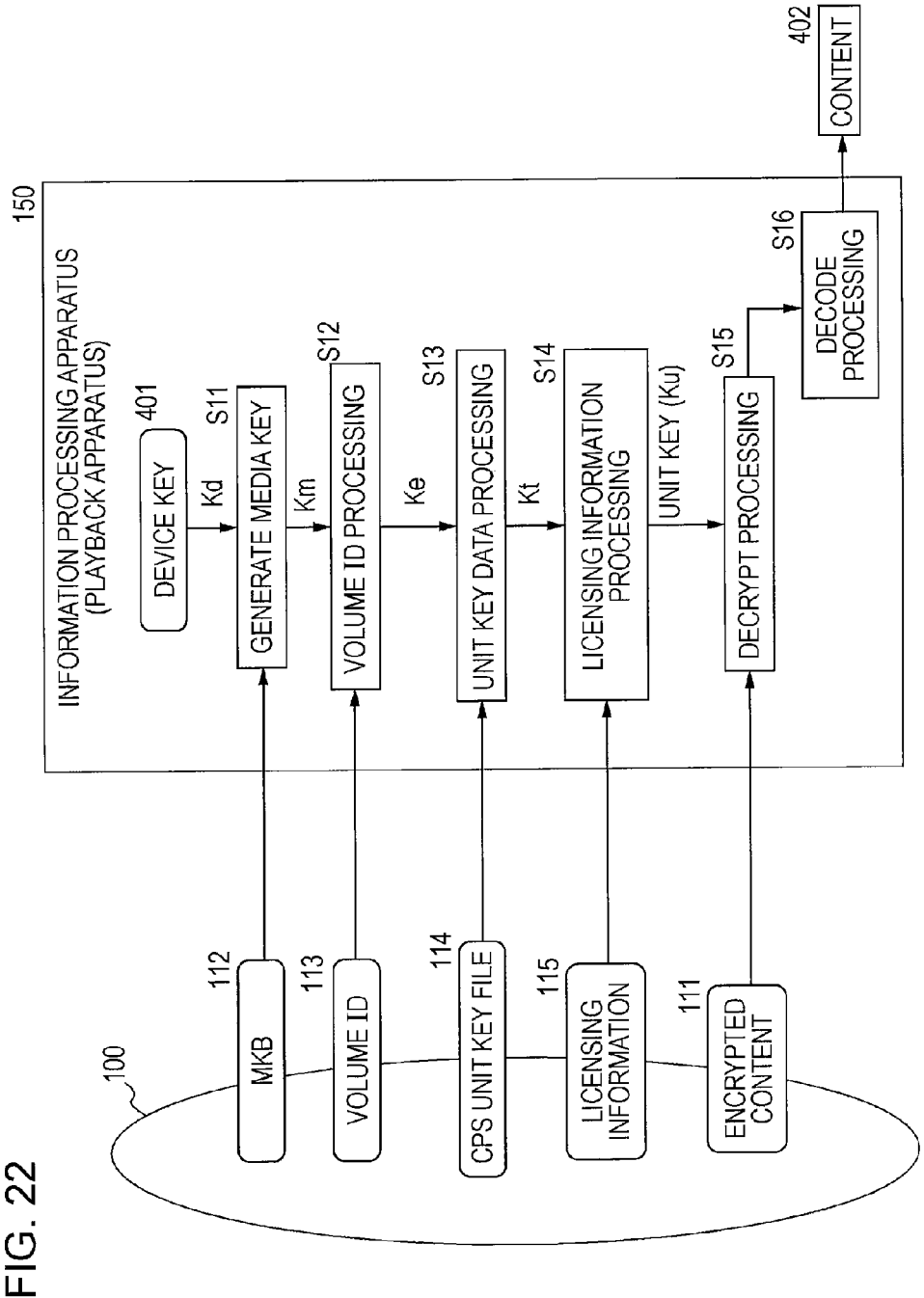
FIG. 22 illustrates a content playback processing sequence in an information processing apparatus.
Figure 23:
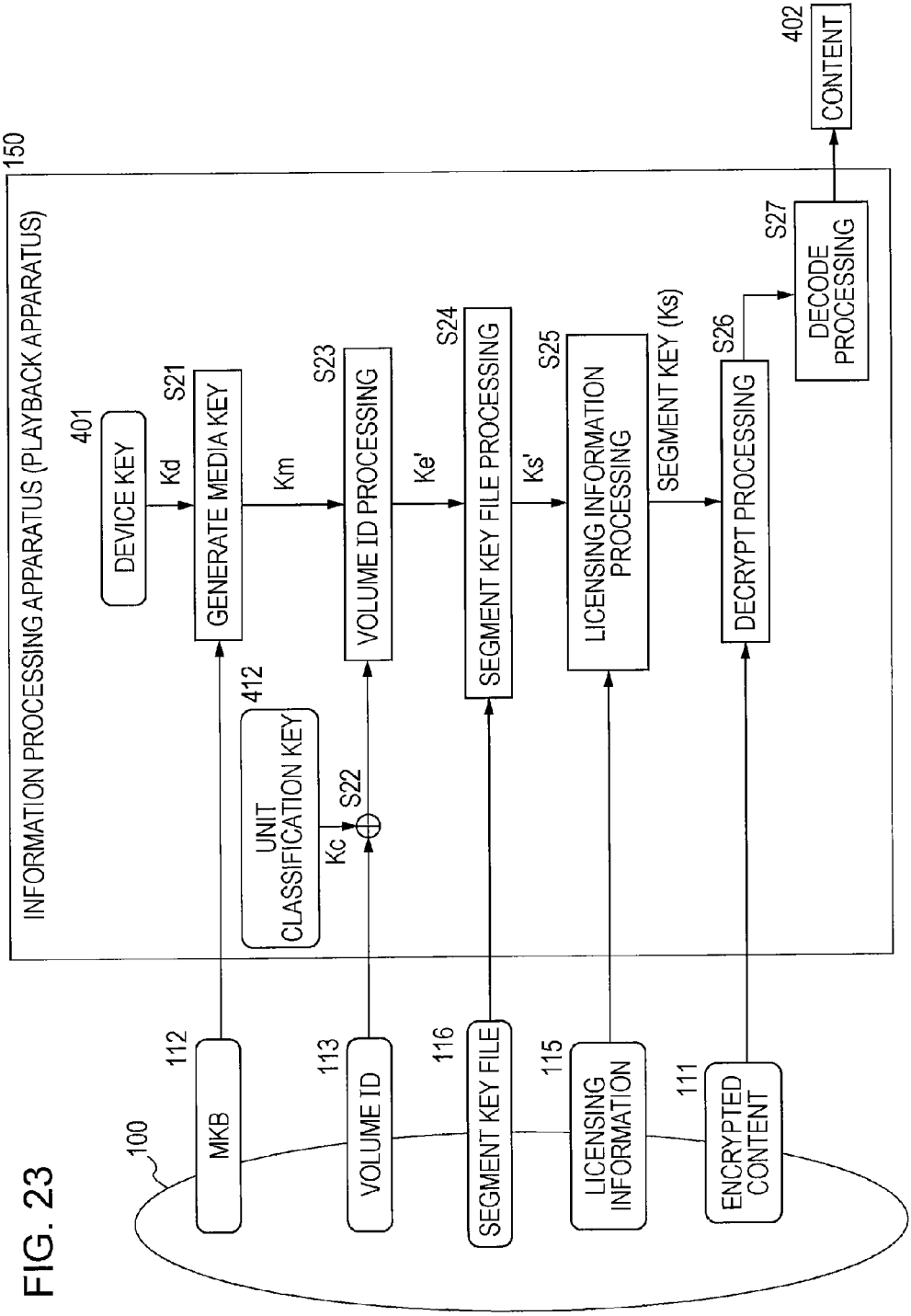
FIG. 23 illustrates a content playback processing sequence in an information processing apparatus.

FIG. 22 illustrates playback processing performed by obtaining a unit key (Ku), and FIG. 23 illustrates a playback sequence for playing back segments, i.e., a playback sequence for decrypting segment data by obtaining segment keys (Ks).

The playback sequence performed by obtaining the unit key shown in FIG. 22 is first discussed. The information processing apparatus 150 reads various information from the information recording medium 100, and decrypts encrypted content based on a unit key (Ku) generated by key generation processing performed by using the read data and a device key 401 owned by the information processing apparatus 150.

The information processing apparatus 150 first reads the device key (Kd) 401 stored in the memory. The device key 401 is a private key stored in the information processing apparatus having a license concerning the content usage.

Then, in step S11, by using the device key 401, the information processing apparatus 150 decrypts the MKB 112, which is a cryptographic key block storing the media key Km therein, stored in the information recording medium 100, thereby obtaining the media key Km.

Then, in step S12, the information processing apparatus 150 performs encrypt processing based on the media key Km obtained in MKB processing in step S11 and the volume ID 113 read from the information recording medium 100, thereby generating a title-key generating key Ke (embedded Key). This key generating processing is executed based on, for example, an AES encryption algorithm.

Details of the AES encryption algorithm are discussed below with reference to FIG. 24. As the processing based on the AES encryption algorithm, for example, an AES-based hash function [AES_H] is used. The AES-based hash function is configured as a combination of a key generation processing execution unit (AES_G), which executes data decrypt processing by using AES encrypt processing, and an exclusive-OR unit. The AES_G unit is configured, as shown in FIG. 24, as a combination of an AES decrypt unit (AES_D) and an exclusive-OR unit.

Figure 24:
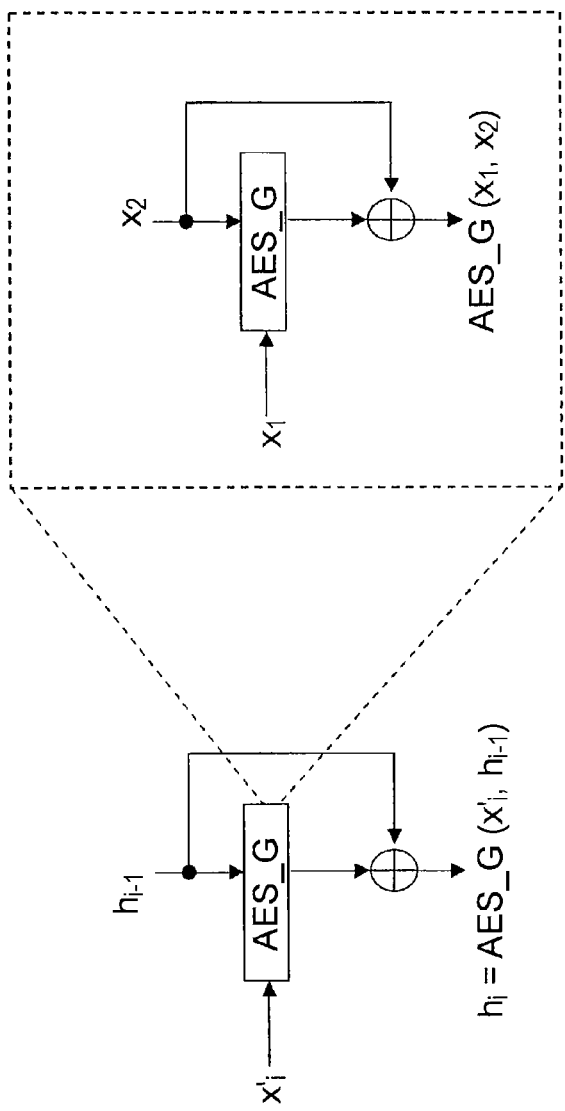
FIG. 24 illustrates details of an AES encryption algorithm.

The processing for generating the title-key generating key Ke (embedded Key) in step S12 in FIG. 22 may be executed by using, for example, the AES-based hash function [AES_H] shown in FIG. 24, by inputting the media key Km obtained in MKB processing in step S11 and the volume ID 113 read from the information recording medium 100.

Then, in step S13, based on the title-key generating key Ke (embedded Key) and the encrypted CPS unit key [Kun] obtained from the CPS unit key file 114 (see FIGS. 5 and 6) read from the information recording medium 100, unit key data processing, for example, encrypt processing (AES_H), is executed to obtain the title key Kt.

Then, in step S14, the unit key Ku is generated by encrypt processing (AES_H) based on the title key Kt and the licensing information 115 read from the information recording medium 100. In step S15, decrypt processing (for example, AES_D) using the unit key is executed on the encrypted content read from the information recording medium 100.

Then, in step S16, necessary decode processing, such as MPEG-decoding, decompression, and descrambling, is executed so that content 402 can be obtained.

The decode processing sequence for non-segment data, which is not segment portions, has been discussed. In an information recording medium, content without segment portions having a plurality of variations discussed with reference to FIGS. 3 and 4, i.e., content having only non-segments portions, may be included. Such content can be decrypted and played back with the unit key generated in the process as shown in FIG. 22.

For content including segment portions having a plurality of variations discussed with reference to FIGS. 3 and 4, segment keys are generated according to the sequence shown in FIG. 23. The individual steps in the sequence shown in FIG. 23 are discussed below.

The information processing apparatus 150 reads the device key (Kd) 401 stored in the memory. The device key 401 is the device key discussed with reference to FIG. 22, and is a private key stored in the information processing apparatus having a license concerning the content usage.

Then, in step S21, by using the device key 401, the information processing apparatus 150 decrypts the MKB 112, which is a cryptographic key block storing the media key Km therein, stored in the information recording medium 100, thereby obtaining the media key Km.

Then, in step S22, computation based on the volume ID 113 read from the information recording medium 100 and a unit classification key (Kc) 412 stored in the information processing apparatus, exclusive-OR (XOR) computation, for example, is executed. The unit classification key (Kc) 412 is selected from the unit classification key file (see FIG. 10) stored in the information processing apparatus on the basis of the unit classification number set in the CPS unit corresponding to the content to be played back.

In step S23, encrypt processing is executed on the computation result in step S22 together with the media key Km obtained in the MKB processing in step S21, thereby generating a title-key generating key Ke' (embedded Key). This key generating processing is executed based on the AES encryption algorithm discussed with reference to FIG. 24.

Then, in step S24, based on the title-key generating key Ke', [Enc(Ke'(n, i), Ks'(x, y))] obtained from the segment key file 116 (see FIGS. 7 and 8) read from the information recording medium 100 is decrypted so that the segment-key generating key Ks'(x, y) is obtained. Based on the segment number to be played back, encrypted data corresponding to one of segments 0 to 14 set in the segment key file 116 is obtained and decrypted.

In step S25, the segment key Ks(x, y) is generated by encrypt processing (AES_H) based on the segment-key generating key Ks'(x, y) and the licensing information 115 read from the information recording medium 100. Then, in step S26, decrypt processing (for example, AES_D) using the segment key is executed on the segment data of the encrypted content read from the information recording medium 100.

The segment data to be selected is one of the variation numbers 0 to 15. The segment data is automatically selected by the playlist. That is, based on the version number determined from the unit classification number of the CPS unit corresponding to content to be played back and the unit classification key file stored in the information processing apparatus, the playlist is determined by the movie object. The segment data to be selected corresponds to play items selected by the playlist. In the segment key Ks(x, y), y is the variation number and the x is the segment number. The information processing apparatus executes processing for generating a segment key for each segment.

After decrypting the segment data by the generated segment key Ks, in step S27, necessary decoding processing, such as MPEG-decoding, decompression, and descrambling, is executed so that the content 402 can be obtained. The decrypt processing sequence for the segment data has been discussed above.

The processing for segment data and the processing for non-segment data are individually performed as shown in FIGS. 22 and 23, respectively. A content playback processing sequence including both processing operations for segment data and non-segment data by an information processing apparatus is described below with reference to the flowchart in FIG. 25.

Figure 25:
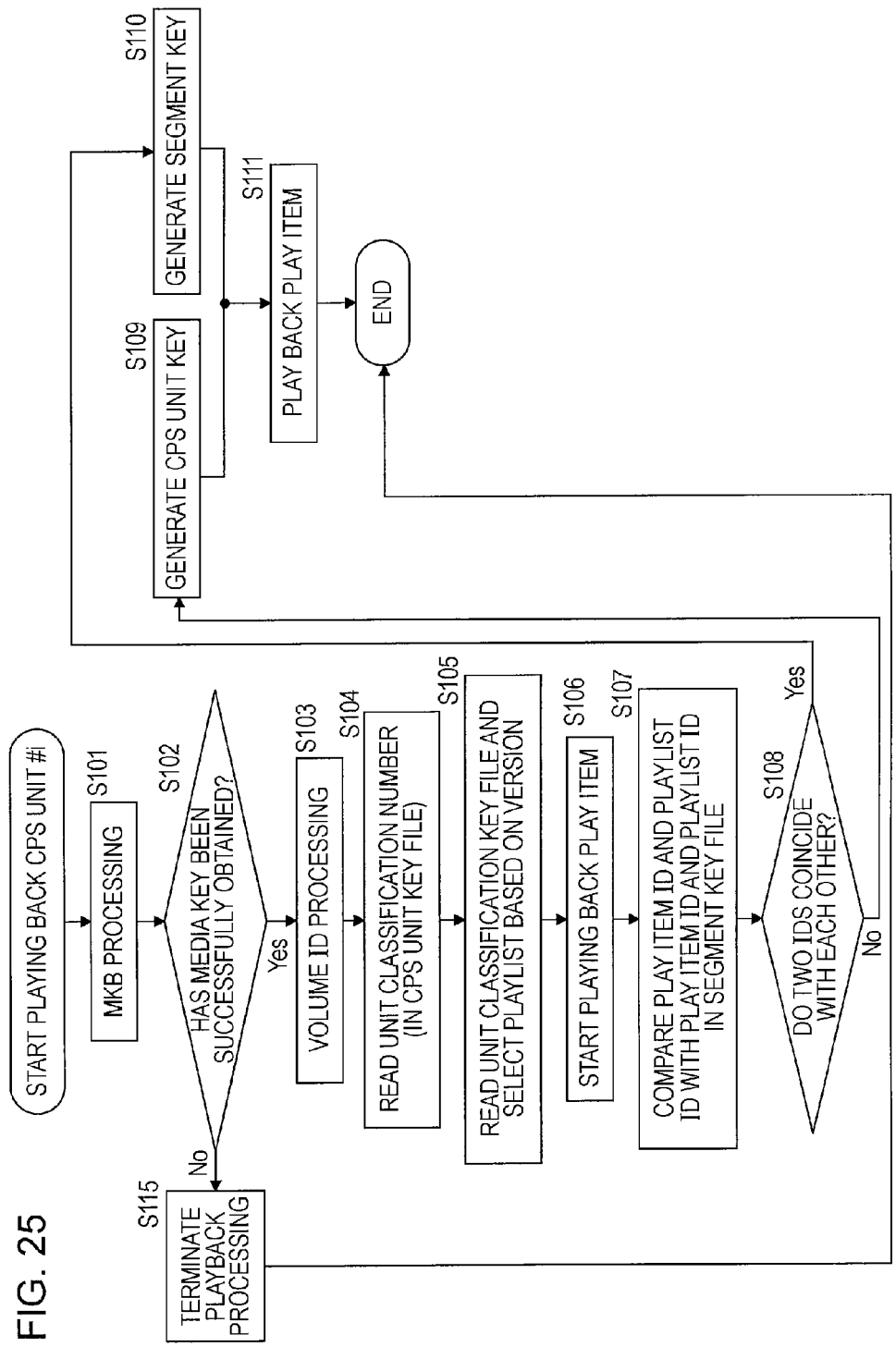
FIG. 25 is a flowchart illustrating a content playback processing sequence.

The individual steps in the flowchart shown in FIG. 25 are as follows. First, the information processing apparatus selects a CPS unit of content to be played back. In the CPS unit, the unit number (#i) as the unit identifier is set, as discussed with reference to FIGS. 2 and 5.

In step S101, the information processing apparatus reads the MKB from the information recording medium and performs encrypt processing using the media key stored in the information processing apparatus, thereby obtaining the media key from the MKB. This processing corresponds to the processing in step S11 in FIG. 22 or step S21 in FIG. 23.

If it is determined in step S102 that the media key has not been obtained successfully, the process proceeds to step S115 in which playback processing is terminated, and the processing is ended. This means that the information processing apparatus is revoked, that is, the information processing apparatus is not authenticated as an authorized playback apparatus. The MKB is suitably updated so that unauthorized devices can be prevented from obtaining the media key by using the device keys.

If the media key has been obtained successfully, the process proceeds to step S103 in which the processing using the volume ID read from the information recording medium is executed. By the processing using the volume ID, the title-key generating key Ke (embedded Key) is generated. This processing corresponds to the processing in step S12 in FIG. 22.

Then, in step S104, the unit classification number is read from the CPS unit key file (see FIGS. 5 and 6) stored in the information recording medium. Then, in step S105, the unit classification key file (see FIG. 10) stored in the memory of the information processing apparatus is read so that the unit version can be obtained based on the unit classification number of content to be played back and the unit classification key file, and the playlist is selected by the movie object based on the unit version (see FIGS. 11 and 12).

Then, in step S106, the playback operation of the play items is started. The play items are information, as discussed with reference to FIGS. 2 and 12, for specifying playback zones contained in the playlist designated by the playback program of content to be played back. The play items are contained in the playlist selected based on the playback program (movie object) discussed with reference to FIGS. 11 and 12.

Then, in step S107, the ID of the playlist selected by the playback program (movie object) and the play item ID are compared with the playlist ID and the play item ID set in the segment key file (see FIGS. 7, 8, and 9) corresponding to the CPS unit associated with the content to be played back. If the playlist ID and the play item ID coincide with those in the segment key file, it is determined that the corresponding data is segment data to be played back. Then, in step S110, the segment key is generated, and in step S111, the play item as the segment data is decrypted and played back. The processing for generating the segment key executed in step S110 is performed in accordance with the sequence discussed with reference to FIG. 23.

If, in step S107, the ID of the playlist selected by the playback program (movie object) and the play item ID do not coincide with the playlist ID and the play item ID set in the segment key file (see FIGS. 7, 8, and 9) corresponding to the CPS unit associated with the content to be played back, it is determined that the corresponding data is not segment data, but non-segment data. Then, in step S109, the unit key is generated, and in step S111, the play item as the non-segment data is decrypted and played back. The processing for generating the unit key executed in step S109 is performed in accordance with the sequence discussed with reference to FIG. 22.

Figure 26:
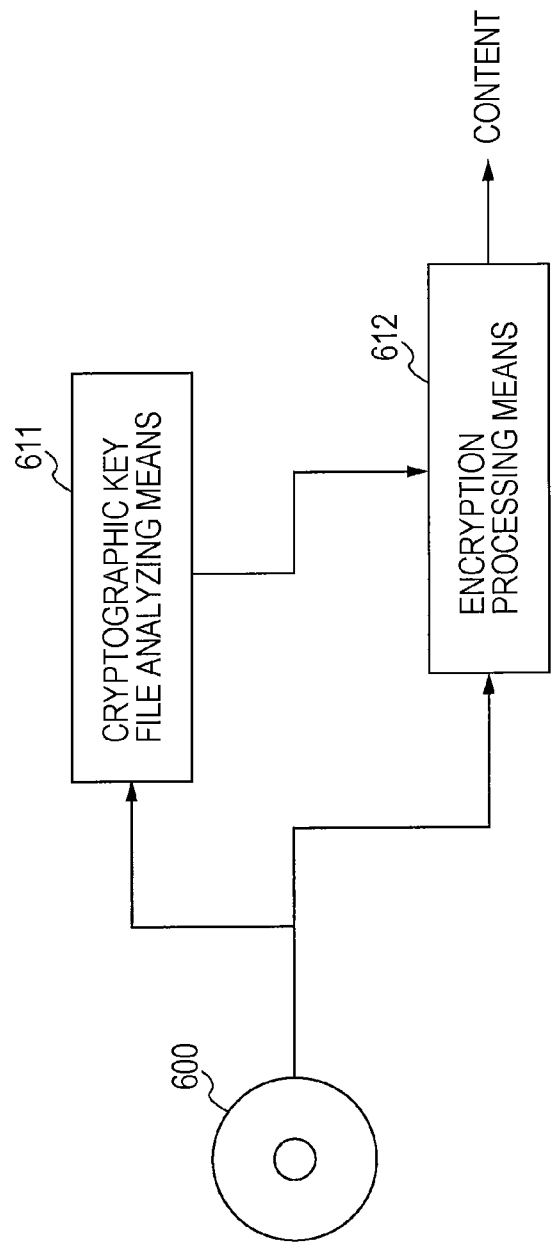
FIG. 26 is a block diagram illustrating the functional configuration of an information processing apparatus that plays back content.

A description is now given, with reference to FIG. 26, of the functional configuration of an information processing apparatus that decrypts and plays back encrypted content recorded on an information recording medium. FIG. 26 is a functional block diagram illustrating the information processing apparatus, and the specific hardware configuration is discussed below with reference to FIG. 27.

The information processing apparatus shown in FIG. 26 includes cryptographic key file analyzing means 611 and encrypt processing means 612.

The cryptographic key file analyzing means 611 reads a cryptographic key file including cryptographic key information used for encrypting content from an information recording medium 600, and obtains the cryptographic key for decrypting the content from the cryptographic key file. The encrypt processing means 612 decrypts the content by using the cryptographic key obtained based on an analysis of the cryptographic key file analyzing means 611.

From the unit key files discussed with reference to FIGS. 14 through 19, the cryptographic key file analyzing means 611 obtains the information concerning the generation of the unit key associated with content management units, which serve as a base unit for using the content, and unit classification number, which serves as the identification information concerning a combination of segment keys used for decrypting the segment portions forming the content, and also obtains the segment key generating information from the segment key file.

Based on the unit key generating information, the unit classification number, and the segment key generating information obtained by the cryptographic key file analyzing means 611, the encrypt processing means 612 obtains the unit key and the segment keys used for decrypting the content, and decrypts the content based on the unit key and the segment keys.

The unit key file analyzed by the cryptographic key file analyzing means 611 is one of the following unit key files, as discussed with reference to FIGS. 14 through 19:

(a1) a cryptographic key file in which a unit classification number is associated with each content management unit;

(a2) a cryptographic key file in which a unit classification number is associated with each index contained in a content management unit; and (a3) a cryptographic key file in which a plurality of unit classification numbers are associated with each content management unit.

If the unit key file stored in the information recording medium 600 is the above-described (a1) unit key file, the cryptographic key file analyzing means 611 obtains the unit classification number set for the content management unit, and the encrypt processing means 612 obtains the segment key sequence set for the content management unit in accordance with the unit classification number, and decrypts the content according to the obtained segment key sequence.

If the unit key file stored in the information recording medium 600 is the above-described (b1) unit key file, the cryptographic key file analyzing means 611 obtains the unit classification number set for the index contained in a content management unit, and the encrypt processing means 612 obtains the segment key sequence set for the index in accordance with the unit classification number, and decrypts the content according to the obtained segment key sequence.

If the unit key file stored in the information recording medium 600 is the above-described (1c) unit key file, the cryptographic key file analyzing means 611 obtains the unit classification number associated with the content to be played back from among a plurality of unit classification numbers set for the content management unit, and the encrypt processing means 612 obtains the segment key sequence set for the content management unit in accordance with the unit classification number, and decrypts the content according to the obtained segment key sequence.

[5. Example of Configuration of Information Processing Apparatus]

An example of the hardware configuration of an information processing apparatus for the above-described content recording processing or playback processing is described below with reference to FIG. 27.

An information processing apparatus 800 includes a drive 890 for driving an information recording medium 891 and inputting and outputting a data recording/playback signal, a CPU 870 for executing data processing according to various programs, a ROM 860, which serves as a storage area for storing programs and parameters, a memory 880, an input/output I/F 810 for inputting and outputting digital signals, an input/output I/F 840 for inputting and outputting analog signals and including A/D and D/A converters 841, an MPEG codec 830 for encoding and decoding MPEG data, TS (Transport Stream)/PS (Program Stream) processing means 820 for executing TS/PS processing, encrypt processing means 850 for executing various encrypt processing operations, and digital watermark processing means 855. The above-described blocks are connected to a bus 801. The digital watermark processing means 855 is required in an information processing apparatus when an authoring facility or a disc factory that performs content editing generates recording data, and is not essential in an information processing apparatus that performs regular data playback processing.

The operation of the information processing apparatus when recording data is as follows. Two cases can be considered where data to be recorded is a digital signal and an analog signal as an input.

If a digital signal is input, it is input from the digital signal input/output I/F 810 and is converted into a storage data format by the CPU 870 and the TS/PS processing means 820. Then, the storage data format is converted into, for example, an MPEG2 format, by the MPEG codec 830, and is encrypted by the encrypt processing means 850. The encrypt processing is executed by using the CPS unit key and segment keys, as discussed above, and is executed after generating required key data. The data encrypted by the encrypt processing means 850 is stored in the information recording medium 891.

If an analog signal is input, it is input from the input/output I/F 840 and is converted into a digital signal by the A/D converter 841, and is further converted into a codec to be used when being recorded by the MPEG codec 830. Then, the codec is converted into AV multiplexed data, which is a recording data format, by the TS/PS processing means 820 and is encrypted by the encrypt processing means 850. The encrypted data is then stored in the recording medium 891.

The processing for playing back data from the information recording medium is now described below. It is now assumed, for example, that AV stream data formed of MPEG-TS data is played back. If data read from the information recording medium 891 by the drive 890 is identified as a content management unit, required key data is generated and the content management data is decrypted by using the generated keys in the encrypt processing means 850. That is, the unit key and segment keys associated with the content management unit are obtained, and based on the obtained unit key and segment keys, decrypt processing using the keys is executed in the encrypt processing means 850.

The decrypted content data is divided into individual data, such as video, audio, and subtitles, by the TS (Transport Stream)/PS (Program Stream) processing means 820. The digital data decrypted by the MPEG codec 830 is converted into an analog signal by the D/A converter 841 of the input/output I/F 840 and is then output. If digital output is performed, MPEG-TS data is output as digital data via the input/output IF 810. In this case, the data is output to a digital interface, such as an IEEE1394 interface, an Ethernet cable, or a wireless LAN. If network connection is implemented, the input/output IF 810 has a network connection function. If the playback apparatus converts the data into a format that can be received by a receiving device, the MPEG codec 830 performs rate conversion and codec conversion on the video, audio, and subtitles divided by the TS/PS processing means 820, and then, the TS/PS processing means 820 multiplexes the divided data into a MPEG-TS or MPEG-PS and then outputs the multiplexed data from the digital input/output I/F 810. Alternatively, the CPU 870 converts the data into a codec or a multiplexed file other than MPEG and outputs it from the digital input/output I/F 810.

The program for executing the playback and recording processing is stored in the ROM 860, and while executing the program, the memory 880 is used as a storage area for parameter and data or as a work area if necessary. Although the apparatus shown in FIG. 27 is capable of performing both recording and playback processing, an apparatus having only a playback function or a recording function may be used, and the present invention is applicable to such an apparatus.

The embodiments have been described in detail while referring to. It is apparent, however, that various modifications and alterations may be made by those skilled in the art without departing from the spirit of the invention. That is, the embodiment is an example only to disclose the present invention and is not intended to limit the invention. To understand the gist of the invention, the claims should be taken into consideration.

The series of processing operations described in the specification may be executed by hardware or software or a combination thereof. If software is used, a program recording a processing sequence therein can be installed into a memory of a computer built in dedicated hardware or a general-purpose computer that can execute various processing operations.

The program may be prerecorded in a hard disk or a ROM (Read Only Memory) as a recording medium. Alternatively, the program may be temporarily or permanently stored (recorded) in a removable recording medium, such as a flexible disk, a CD-ROM (Compact Disc Read Only Memory), a MO (Magneto optical) disk, a DVD (Digital Versatile Disc), a magnetic disk, or a semiconductor memory. Such a removable recording medium can be provided as so-called "package software".

The program may be installed into a computer from the above-described removable recording medium. Alternatively, the program may be wirelessly transferred from a download site into a computer or transferred into a computer by wired means via a network, such as a LAN (Local Area Network) or the Internet, and the computer can receive the transferred program and install it in a recording medium, such as a built-in hard disk.

The various processing operations discussed in the specification may be executed in chronological order as described in the specification. Alternatively, the processing operations may be executed in parallel or individually in accordance with the processing performance of an apparatus executing the processing operations or according to the necessity. In this specification, the system is a logical set of a plurality of apparatuses, and it is not essential that the apparatuses be in the same housing. It is not necessary that the unit classification numbers be stored in the CPS unit key file. Instead, the unit classification numbers may be stored in a file different from a file storing the CPS unit key generating information as long as they can be switched when performing a playback operation.

INDUSTRIAL APPLICABILITY

As is seen from the foregoing description, according to the embodiments, a unit classification number which defines a playback path of content including encrypted data having different variations generated by encrypting a segment portion, which forms content, by using a plurality of segment keys and encrypted data generated by encrypting a non-segment portion by using a unit key can be set based on various units, such as based on a content management unit and an index. The settings of the unit classification numbers are indicated in a CPS unit key file storing key generating information concerning the generation of a key associated with a CPS unit, which is a content management unit. Based on the CPS unit key file, the unit classification number for content to be played back can be obtained. With this configuration, the settings of paths based on various units and the content usage management based on various units can be implemented.

According to the embodiments, the settings of the unit classification numbers are indicated in a CPS unit key file storing key generating information concerning the generation of a key associated with a CPS unit, which is a content management unit. Based on the CPS unit key file, the unit classification number for content to be played back can be obtained. Accordingly, in the playback processing, by obtaining the unit classification number indicated in the CPS unit key file, a necessary key can be obtained regardless on which base unit the unit classification number is set. That is, a unit classification number, i.e., a path, can be set based on various units, such as based on each CPS unit or an index, such as a title. Alternatively, a plurality of unit classification numbers may be set for a CPS unit. Thus, the content usage management based on various units can be implemented.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus for executing processing for generating recording data to be recorded on an information recording medium, the information processing apparatus comprising:
   a hardware processor; and
   a memory device storing instructions which when executed by the hardware processor, cause the hardware processor to:
   (a) execute processing for encrypting content;
   (b) generate encrypted data having different variations by encrypting a segment portion which forms the content by using a plurality of segment keys;
   (c) encrypt a non-segment portion, which is different from the segment portion, by using a unit key set for a content management unit, which serves as a base unit for using the content; and
   (d) encrypt the content by changing a combination of the segment keys used for encrypting the segment portion in accordance with a unit classification number defining a playback path for the content, the playback path specifying playback of only part of each respective segment portion
   (e) encrypt the content by changing the combination of the segment keys used for encrypting the segment portion in accordance with the unit classification number set for the content management unit; and
   (f) generate the cryptographic key file in which the unit classification number is associated with the content management unit.

2. The information processing apparatus of claim 1, wherein:
   (a) the segment portion has a plurality of variations; and
   (b) the plurality of variations are identical video content in which different digital watermarks are embedded.

3. The information processing apparatus of claim 1, wherein:
   (a) the segment portion is set in a first portion on a playback time axis on which the content is played back; and
   (b) another segment portion is set in a portion different from the playback time axis.

4. The information processing apparatus of claim 1, wherein:
   (a) a plurality of playlists that define a playback order on the playback time axis and a plurality of play items included in each of the playlists are set in accordance with the unit classification number; and
   (b) one of the play items corresponds to the segment.

5. The information processing apparatus of claim 1, wherein the instructions, when executed by the processor, causes the processor to set a plurality of the unit classification numbers.

6. An information recording medium manufacturing apparatus for recording data obtained from an authoring processing device, the authoring processing device comprising:
   a hardware processor;
   a recorder operatively coupled to the hardware processor; and
   a memory device storing instructions which when executed by the hardware processor, cause the hardware processor, in cooperation with the recorder, to:
   (a) encrypt content;
   (b) generate a cryptographic key file including cryptographic key information used for encrypting the content;
   (c) record the encrypted content and the cryptographic key file;

(d) generate encrypted data having different variations by encrypting a segment portion which forms the content by using a plurality of segment keys;

(e) encrypt a non-segment portion, which is different from the segment portion, by using a unit key set for a content management unit, which serves as a base unit for using the content;

(f) encrypt the content by changing a combination of the segment keys used for encrypting the segment portion in accordance with a unit classification number defining a playback path for the content, the playback path specifying playback of only part of each respective segment portion; and (g) generate the cryptographic key file in which: (i) unit key generating information concerning the generation of the unit key associated with the content management unit; and (ii) a unit classification number, which serves as identification information concerning a combination of the segment keys used for encrypting the segment portion are recorded (h) encrypt the content by changing the combination of the segment keys used for encrypting the segment portion in accordance with the unit classification number set for the content management unit; and (i) generate the cryptographic key file in which the unit classification number is associated with the content management unit.

7. The information recording medium manufacturing apparatus of claim 6, wherein the instructions, when executed by the processor, causes the processor to encrypt the content by changing a combination of the segment keys used for encrypting the segment portion in accordance with each of a plurality of the unit classification numbers.

8. An information processing apparatus for decrypting and playing back encrypted content recorded on an information recording medium, the information processing apparatus comprising:
a hardware processor; and
a memory device storing instructions which when executed by the hardware processor, cause the hardware processor to:
(a) obtain a cryptographic key used for decrypting the content from a cryptographic key file including cryptographic key information used for encrypting the content;
(b) decrypt the content by using the obtained cryptographic key;
(c) obtain, from the cryptographic key file:
(i) unit key generating information concerning the generation of a unit key associated with a content management unit, which serves as a base unit for using the content; and
(ii) a unit classification number which defines a playback path, which specifies playback of only part of each respective segment portion, and serves as identification information concerning a combination of segment keys used for decrypting a segment portion forming the content;
(d) obtain the unit key and the segment keys used for decrypting the content from the unit key generating information and the unit classification number; and
(e) decrypt the content based on the obtained unit key and segment keys;
(f) obtain, from among a plurality of unit classification numbers set for the content management unit, a unit classification number set for the content to be played back from the cryptographic key file; and (g) obtain a segment key sequence set for the unit classification number; and
(h) decrypt the content in accordance with the obtained segment key sequence.

9. The information processing apparatus of claim 8, wherein the instructions, when executed by the processor, cause the processor to:
(a) obtain the unit classification number set for the content management unit from the cryptographic key file;
(b) obtain a segment key sequence set for the content management unit set in accordance with the unit classification number; and
(c) decrypt the content in accordance with the obtained segment key sequence.

10. The information processing apparatus of claim 8, wherein the instructions, when executed by the processor, cause the processor to:
(a) obtain the unit classification number set for index information included in the content management unit from the cryptographic key file; and
(b) obtain a segment key sequence set for the index information in accordance with the unit classification number; and
(c) decrypt the content in accordance with the obtained segment key sequence.

11. A method of operating an information recording medium manufacturing apparatus, the method comprising:
(a) encrypting, by a hardware processor, content;
(b) executing, by the hardware processor, processing for generating a cryptographic key file including cryptographic key information used for encrypting the content;
(c) recording, by a recorder, the encrypted content and the cryptographic key file;
(d) generating, by the hardware processor, encrypted data having different variations by encrypting a segment portion which forms the content by using a plurality of segment keys;
(e) encrypting, by the process, a non-segment portion, which is different from the segment portion, by using a unit key set for a content management unit, which serves as a base unit for using the content;
(f) encrypting, by the hardware processor, the content by changing a combination of the segment keys used for encrypting the segment portion in accordance with a unit classification number set for the content; and
(g) generating, by the hardware processor, the cryptographic key file in which: (i) unit key generating information concerning the generation of the unit key associated with the content management unit; and (ii) a unit classification number, which defines a playback path, which specifies playback of only part of each respective segment and serves as identification information concerning the combination of the segment keys used for encrypting the segment portion are recorded
(h) encrypting, by the hardware processor, the content by changing the combination of the segment keys used for encrypting the segment portion in accordance with the unit classification number set for the content management unit; and
(i) generating, by the hardware processor, the cryptographic key file in which the unit classification number is associated with the content management unit.

12. A method of operating an information processing apparatus for decrypting and playing back encrypted content recorded on an information recording medium, the method comprising:
(a) obtaining, by a hardware processor, a cryptographic key used for decrypting the encrypted content from a cryptographic key file including cryptographic key information used for encrypting the content;

(b) decrypting, by the hardware processor, the content by using the obtained cryptographic key;
(c) obtaining, by the hardware processor, from the cryptographic key file:
   (i) unit key generating information concerning the generation of a unit key associated with a content management unit, which serves as a base unit for using the content; and
   (ii) a unit classification number, which defines a playback path, which specifies playback of only part of each respective segment portion, and serves as identification information concerning a combination of segment keys used for decrypting a segment portion which forms the content;
(d) obtaining, by the hardware processor, the unit key and the segment keys used for decrypting the content from the unit key generating information and the unit classification number; and
(e) decrypting, by the hardware processor, the content based on the obtained unit key and segment keys
(f) obtain, from among a plurality of unit classification numbers set for the content management unit, a unit classification number set for the content to be played back from the cryptographic key file; and
(g) obtain a segment key sequence set for the unit classification number; and
(h) decrypt the content in accordance with the obtained segment key sequence.

13. A non-transitory computer-readable medium including executable instructions that when executed by a hardware processor, cause the hardware processor to:
   (a) decrypt and play back encrypted content recorded on an information recording medium;
   (b) obtain a cryptographic key used for decrypting the encrypted content from a cryptographic key file including cryptographic key information used for encrypting the content;
   (c) decrypt the content by using the obtained cryptographic key;
   (d) obtain, from the cryptographic key file:
      (i) unit key generating information concerning the generation of a unit key associated with a content management unit, which serves as a base unit for using the content; and
      (ii) a unit classification number, which defines a playback path, which specifies playback of only part of each respective segment portion, and serves as identification information concerning a combination of segment keys used for decrypting a segment portion which forms the content; and
   (e) obtain the unit key and the segment keys used for decrypting the content from the unit key generating information and the unit classification number; and
   (f) decrypt the content based on the obtained unit key and segment keys,
   (g) obtain, from among a plurality of unit classification numbers set for the content management unit, a unit classification number set for the content to be played back from the cryptographic key file; and
   (h) obtain a segment key sequence set for the unit classification number; and
   (i) decrypt the content in accordance with the obtained segment key sequence.

14. The information processing apparatus of claim 1, wherein:
   a respective unit classification number is assigned to each of a plurality of content management units.

15. The information processing apparatus of claim 14, wherein:
   at least one of the plurality of content management units assigned the respective unit classification number includes at least one of a playback program, a playlist, and a clip.

16. The information processing apparatus of claim 14, wherein the instructions, when executed by the processor, cause the processor to:
   generate a unit key file associating a content management unit number, the respective unit classification number, and a respective unit key for each of the plurality of content management units.

* * * * *